(12) United States Patent
Sferopoulos

(10) Patent No.: US 12,276,133 B2
(45) Date of Patent: Apr. 15, 2025

(54) DETACHABLE IDENTIFICATION KEY HEAD

(71) Applicant: Haralambos Sferopoulos, Salonika (GR)

(72) Inventor: Haralambos Sferopoulos, Salonika (GR)

( * ) Notice: Subject to any disclaimer, the term of this patent is extended or adjusted under 35 U.S.C. 154(b) by 603 days.

(21) Appl. No.: 17/427,691

(22) PCT Filed: Jan. 16, 2020

(86) PCT No.: PCT/GR2020/000008
§ 371 (c)(1),
(2) Date: Mar. 21, 2022

(87) PCT Pub. No.: WO2020/157522
PCT Pub. Date: Aug. 6, 2020

(65) Prior Publication Data
US 2022/0235577 A1   Jul. 28, 2022

(30) Foreign Application Priority Data
Jan. 31, 2019   (GR) .............................. 20190100053

(51) Int. Cl.
*E05B 19/04*   (2006.01)
(52) U.S. Cl.
CPC .................. *E05B 19/046* (2013.01)
(58) Field of Classification Search
CPC ........ E05B 19/00; E05B 19/04; E05B 19/043; E05B 19/046
USPC ......................................................... 70/408
See application file for complete search history.

(56) References Cited

U.S. PATENT DOCUMENTS

| | | | | |
|---|---|---|---|---|
| 3,526,112 A * | 9/1970 | Herrington | ............. | E05B 19/00 D8/347 |
| 3,797,291 A * | 3/1974 | Simorghi | ............... | A45C 11/32 70/456 R |
| 3,895,508 A * | 7/1975 | Crasnianski | ............ | E05B 19/04 70/408 |
| 3,950,973 A * | 4/1976 | Grasnianski | ............ | E05B 19/04 70/408 |
| 5,855,050 A * | 1/1999 | Christie | .................. | E05B 19/04 29/564.2 |
| 7,360,383 B1 * | 4/2008 | Chang | ..................... | E05B 19/04 70/460 |

(Continued)

FOREIGN PATENT DOCUMENTS

| | | |
|---|---|---|
| CN | 107262625 A | 10/2017 |
| GB | 2524988 A | 10/2015 |
| JP | 2894446 B1 | 5/1999 |

OTHER PUBLICATIONS

European Patent Office, International Search Report in International Patent Application No. PCT/GR2020/000008, 4 pp. (May 12, 2020).

(Continued)

*Primary Examiner* — Nathan Cumar
(74) *Attorney, Agent, or Firm* — Leydig, Voit & Mayer, Ltd.

(57) ABSTRACT

A system and method for a key, comprising a key blade having a socket that releasably engages a key head. A method includes cutting an original key head from an original key, forming a socket onto a cut end of the key blade, and attaching a key head onto the socket.

15 Claims, 16 Drawing Sheets

(56) References Cited

U.S. PATENT DOCUMENTS

| | | | | |
|---|---|---|---|---|
| 9,556,649 B1* | 1/2017 | Mueller | ................. | B23Q 3/00 |
| 2003/0209044 A1* | 11/2003 | Plate | .................... | B23P 15/005 |
| | | | | 70/408 |
| 2006/0090528 A1* | 5/2006 | Moening | ................ | E05B 19/24 |
| | | | | 70/408 |
| 2015/0047398 A1* | 2/2015 | Gerlings | ................ | B23C 3/355 |
| | | | | 70/402 |
| 2015/0047399 A1* | 2/2015 | Gerlings | ................ | E05B 19/04 |
| | | | | 70/408 |

OTHER PUBLICATIONS

European Patent Office, Written Opinion in International Patent Application No. PCT/GR2020/000008, 7 pp. (May 12, 2020).

\* cited by examiner

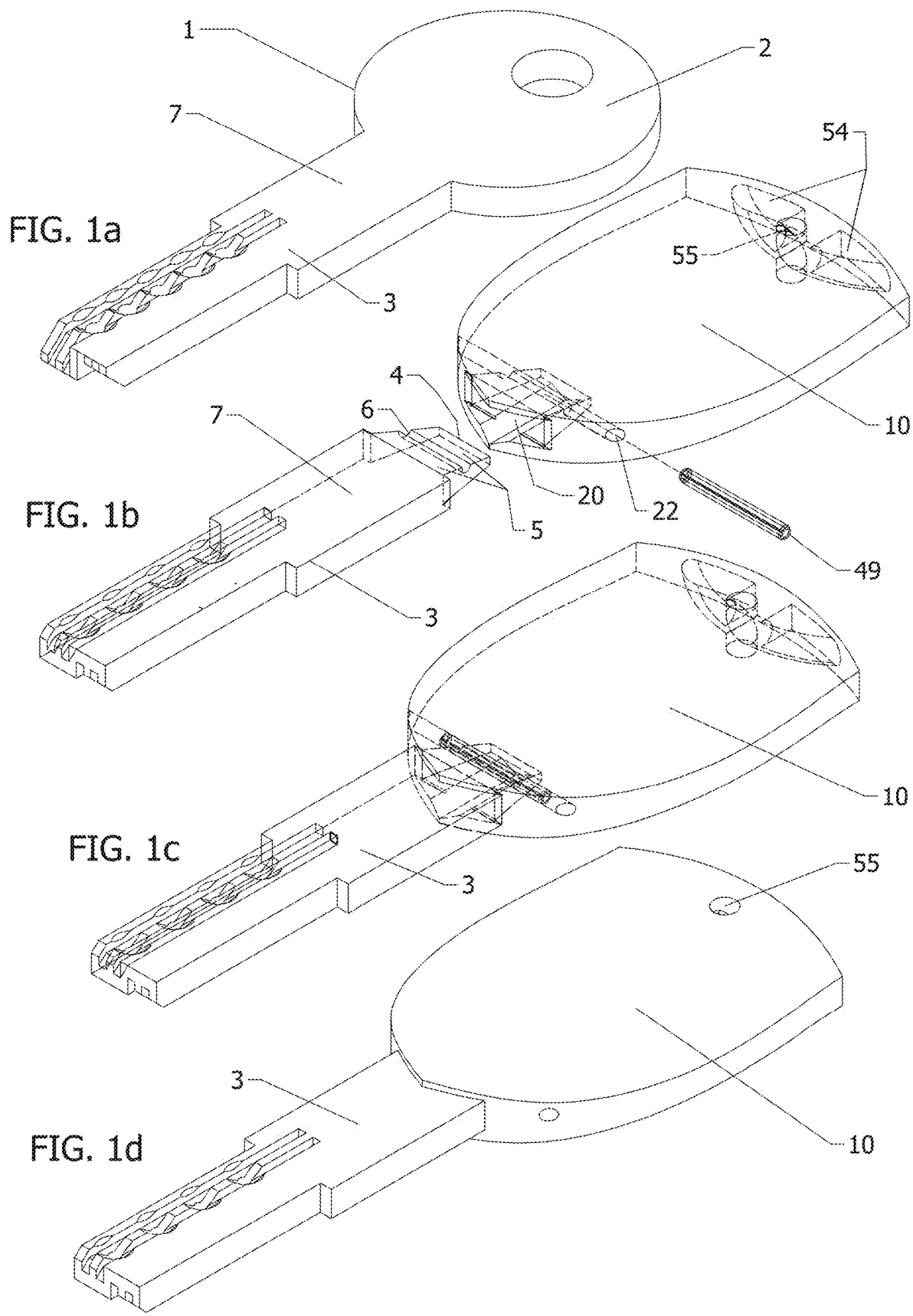

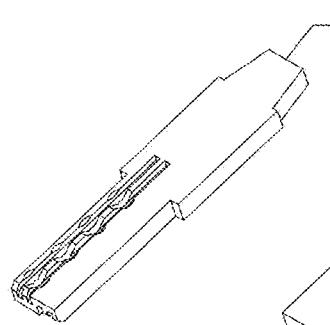
FIG. 4a
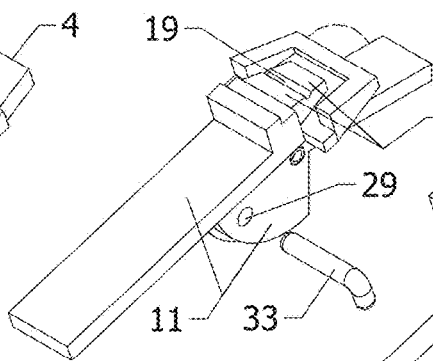
FIG. 4b
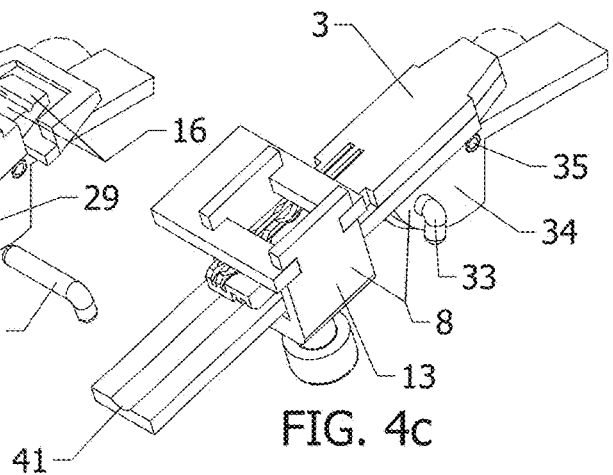
FIG. 4c
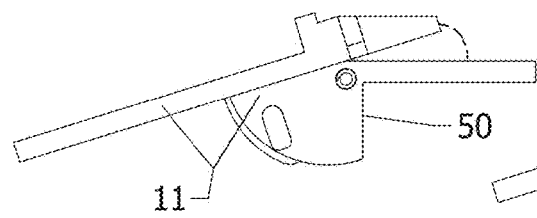
FIG. 4d
FIG. 4e
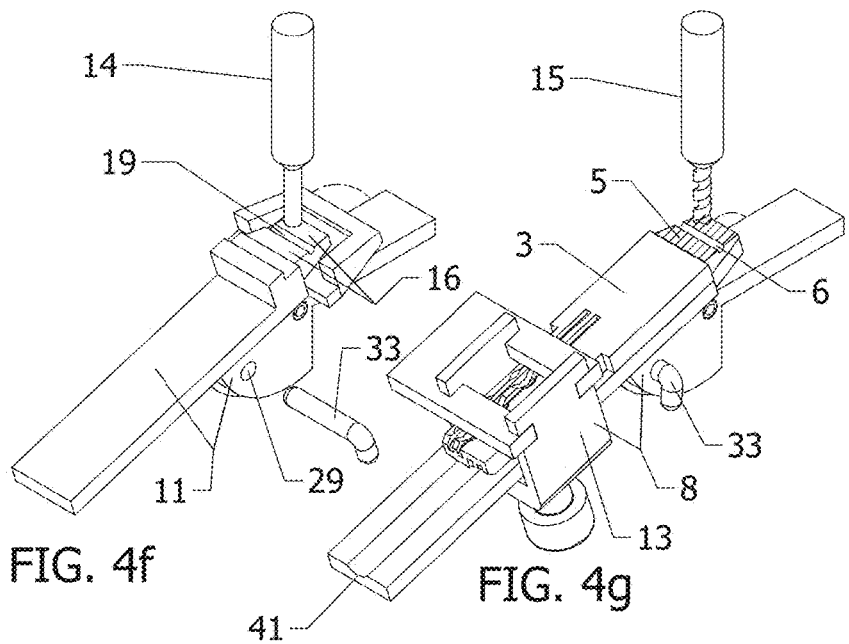
FIG. 4f
FIG. 4g
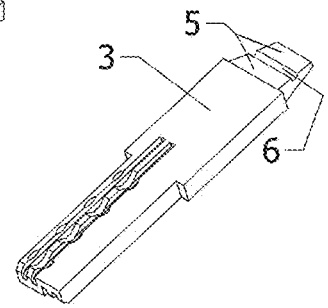
FIG. 4h

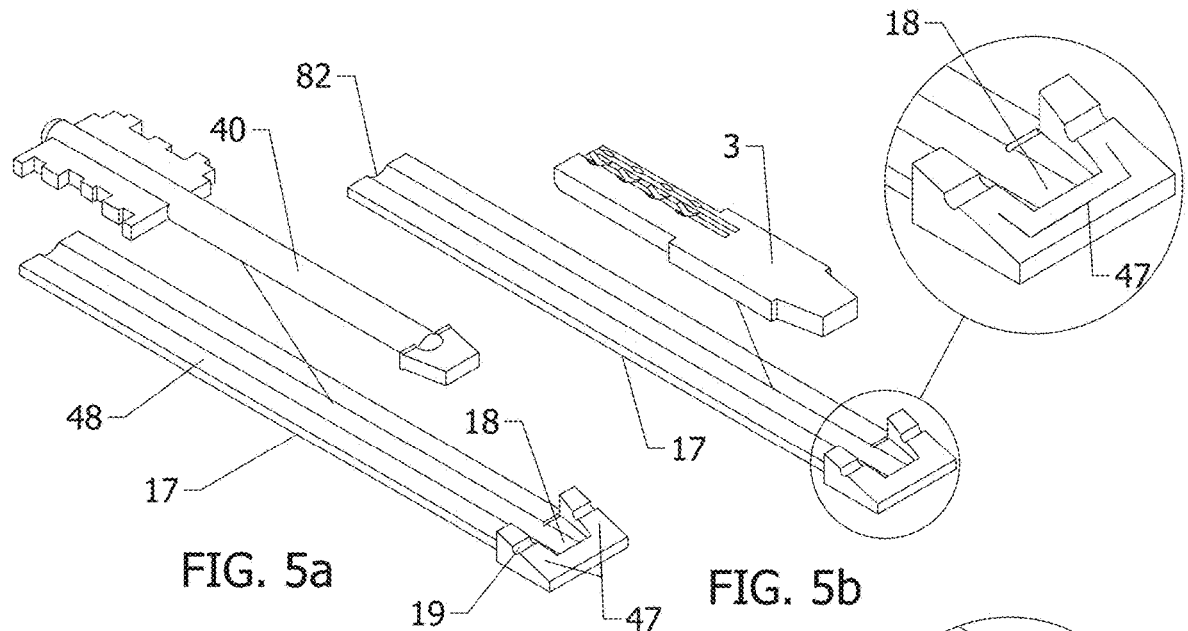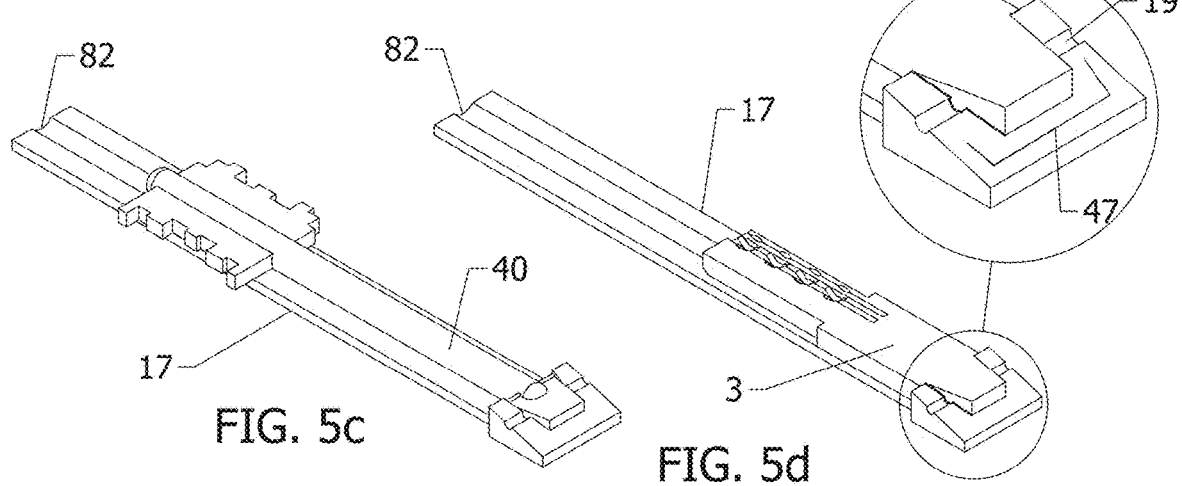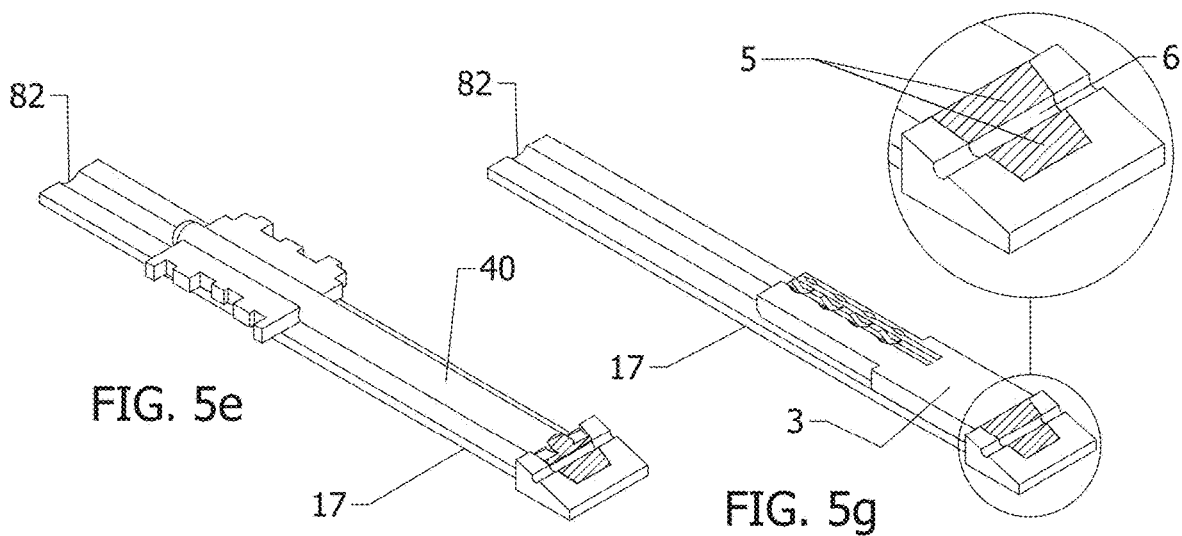

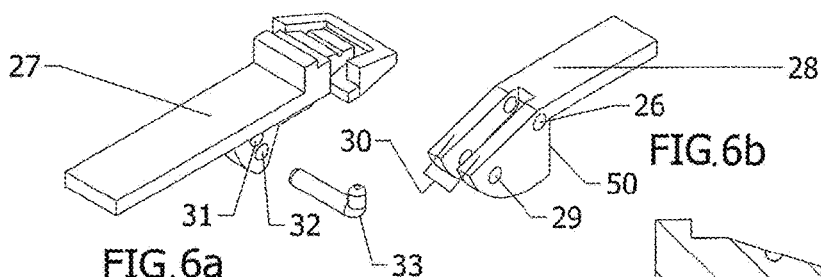
FIG. 6a  FIG. 6b
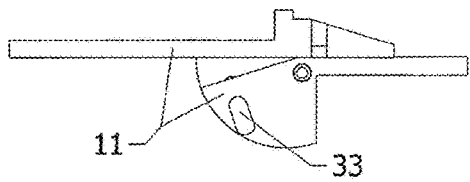
FIG. 6c
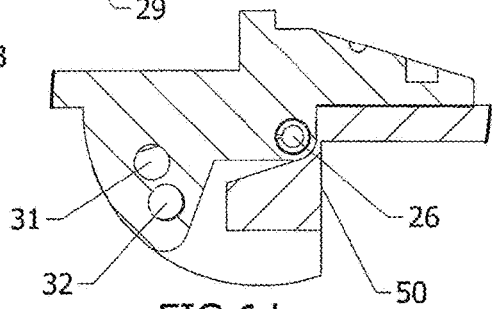
FIG. 6d
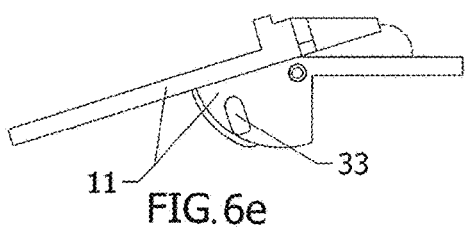
FIG. 6e
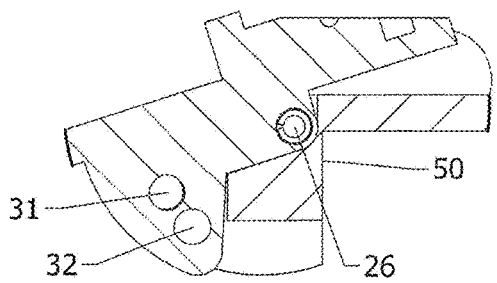
FIG. 6f
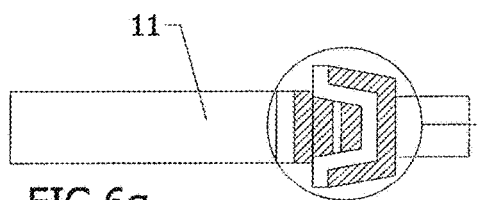
FIG. 6g
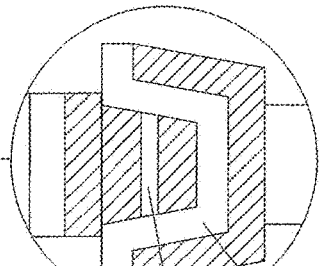
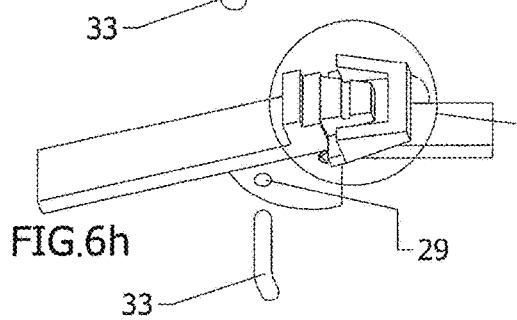
FIG. 6h
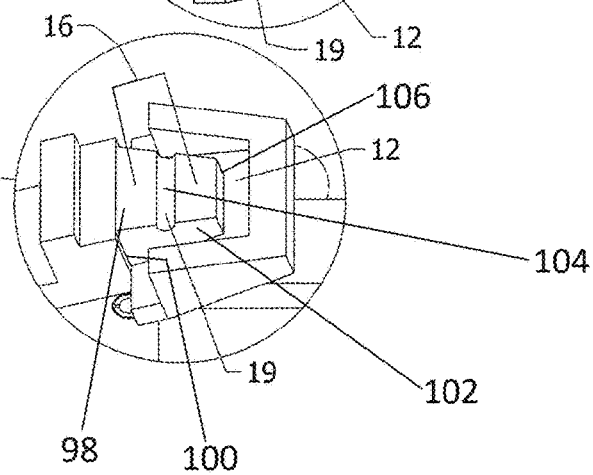

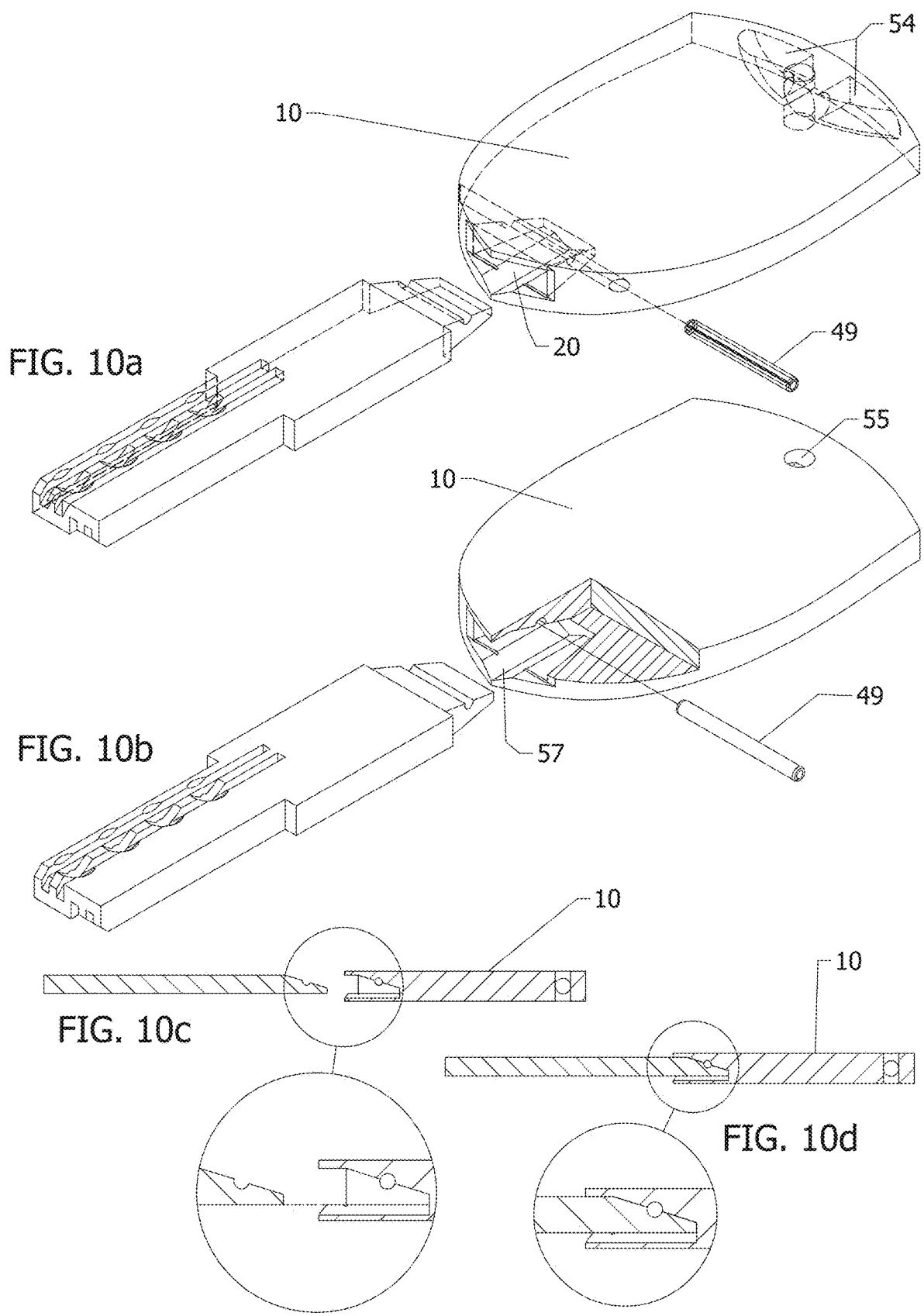

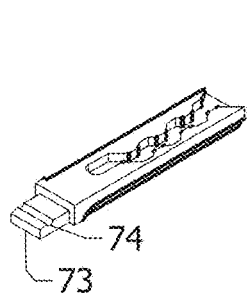
FIG. 14a
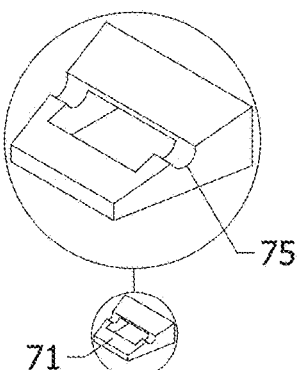
FIG. 14b
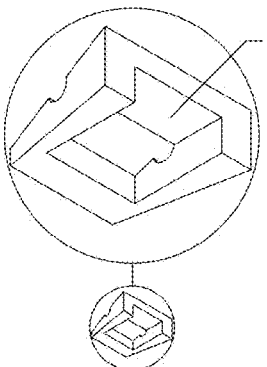
FIG. 14c
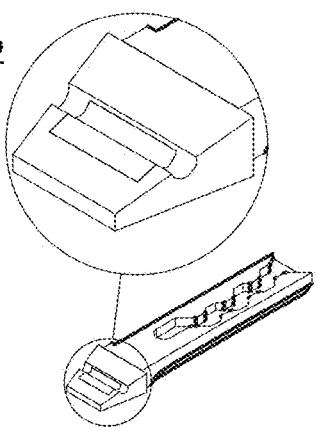
FIG. 14d
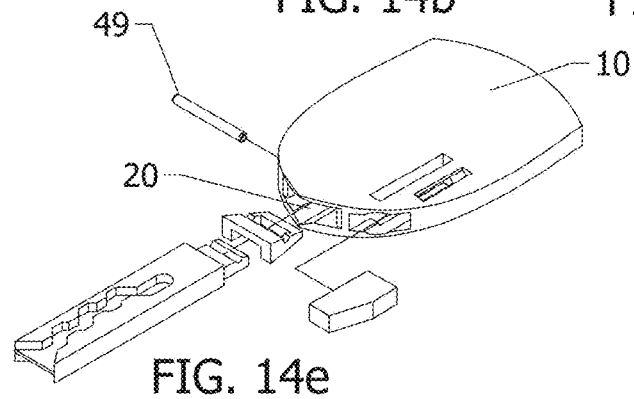
FIG. 14e
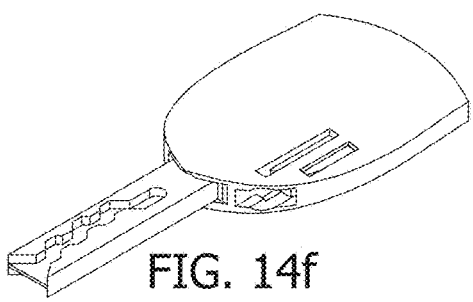
FIG. 14f
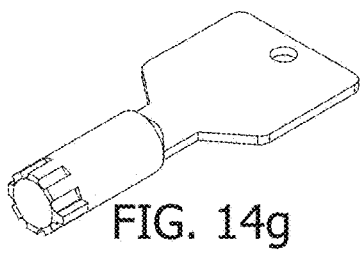
FIG. 14g
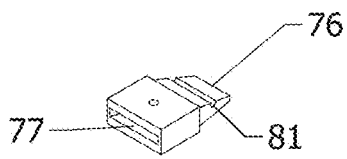
FIG. 14i
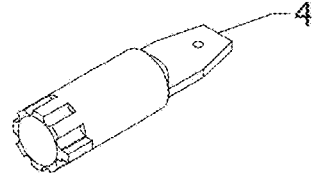
FIG. 14h
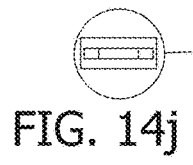
FIG. 14j
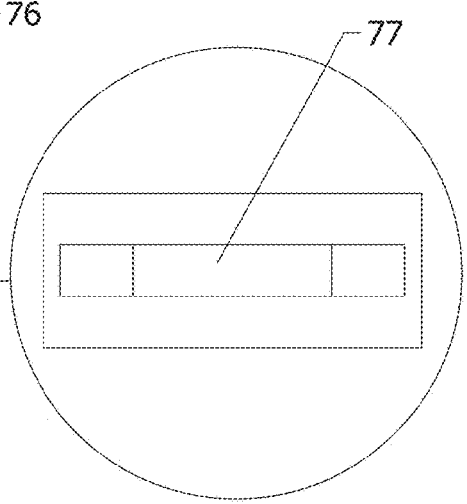
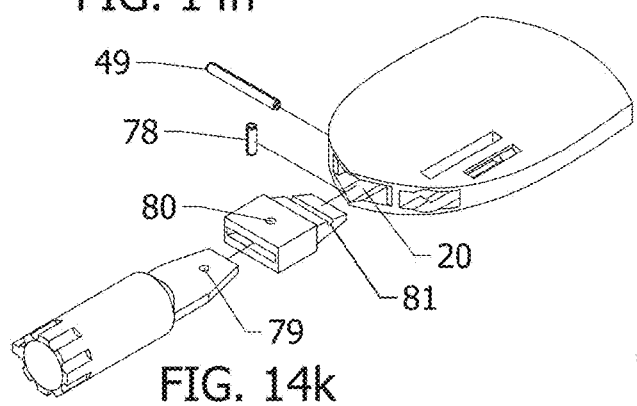
FIG. 14k
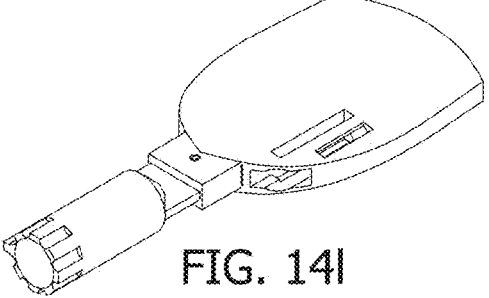
FIG. 14l

DETACHABLE IDENTIFICATION KEY HEAD

CROSS-REFERENCE TO RELATED APPLICATIONS

This patent application is a U.S. national phase patent application of International Patent Application No. PCT/GR2020/000008, filed Jan. 16, 2020, which is fully incorporated herein by reference for all purposes.

FIELD OF THE DISCLOSURE

The invention falls under the category of mechanical engineering and specifically, the field of key manufacture-copying of all key types for cylinder locks, door locks, car locks etc.

BACKGROUND OF THE INVENTION

A first technical problem that appears in the current state of the art is the problem of identifying the keys. Specifically, thousands of different keys have the same key head and the identical or similar key profile and cannot be recognized. Also, when the keys of two individuals are of the same model of a lock brand, it may be difficult to distinguish between the two. Furthermore, these keys cannot be identified in the dark, they cannot be identified by people with impaired vision and they cannot be identified by touch. Moreover, the user that has two or more doors with the same model and brand of lock has keys with the same key head and key profile and it is difficult to distinguish one from the other. Visually they look identical because all keys of the same model and brand are the same and only differ in the cutting depth of the key cuts of each key. This happens because lock manufacturers manufacture each cylinder lock model with a specific keyhole profile shape which in turn means same key profile with an identical key head and shape. The only way to recognize identical keys is by trying them in the door lock. In this instance, all of the keys fit into all the different locks of the same brand, but if the wrong key is inserted into the wrong lock, the user's attempt to turn the key, an attempt which is exacerbated by the user's erroneous assurance that he has put the right key in the correct lock, has unexpected consequences, as the key may be broken inside the lock, or get stuck into the wrong lock, or snapped off inside and jam the lock (if it is a double bit key), or change the key combination of the lock, or even break the lock.

The problem is even more serious with master key systems, where a suite of cylinder locks of the same brand and with the same profile is installed to a hotel, for example. All of the keys fit into all locks, since they have the same profile, however each room has a unique workable key that works only in the door lock of that specific room and not in the door locks of the other rooms, whereas the master key works for all room locks or in certain subsets, such as all the room locks of the first floor, second floor, first wing etc., or for the entire suite of locks of the entire hotel with a grandmaster key. All the keys for the rooms including the master keys are almost identical in all of their characteristics and the only way to distinguish between them, if they get mixed up or if there is no distinguishing mark, such as the room number or "first wing master key" etc., is merely to test them on all locks.

A second technical problem presented in the existing state of the art is that there is no common key identifier that fits and may be installed in all different types and thousands of key profiles because the key heads of these keys have different shapes and sizes and vary in thickness. The colored "caps" and the rubber key rings that are used as an identifier cannot be fitted on most keys, but only on round key heads with a certain measurement. Furthermore, these distinctive "caps" and rubber key rings have the same shape and differ only in color, therefore, they can only be recognized only by sight and not by touch.

A third technical problem presented in the existing state of the art is that the colored keys and "art keys", which are the keys that are colored or have got a design, either on the entire key or only on the key head, are not produced for all key types and thousands of profiles in circulation but solely customized for one key type of cylinder lock and only for 3-4 basic key profiles of this key type or a few more key profiles upon request. For the rest of thousands key profiles, as well as for the other key types such as dimple keys, double bit keys etc. there are neither colored keys nor "art keys" in the market. They are also extremely unprofitable for locksmiths and other key copiers as they have to buy the same design multiple times for each different key profile because colored keys and "art keys" are one piece, meaning the key head is united with the key blade so the design that covers the key head inevitably matches the key blade and its profile. Also colored keys and "art keys" can only be recognized by sight and not by touch. In addition, if the lock is changed, art and colored keys should be thrown away as well, despite their high cost since the key head with the key blade comprise one piece.

A fourth technical problem presented in the existing state of the art is that cylinder keys and other common door lock keys cannot accept an electronic system for electronic locks such as a microchip, transponder, Rfid, Wi-Fi, etc., because existing metal keys are thin and there is no place to fit such an electronic system. This constitutes a problem because more and more electromechanical and electronic locks with an access control system are mounted alongside the main lock. For example, an entrance door of a shop or an office door that operates with the basic door lock can be combined with an electronic mechanism and an access control system to operate with a card, key tag or remote control etc. In that case the user is obliged to always separately carry the key and the card or key tag etc.

In today's state of the art the solutions proposed are:

To date, the first technical problem of key identification and distinction has been dealt with by using various identification key features on the keys, meaning a different identification key badge on each key such as a key tag on the key head, a rubber color ring or a color "cap" that fits on the round key head, or a separate key fob for each key or for each bunch of keys, etc. But given that there are hundreds of types of keys, each with separate key head dimension, these identification key badges and features can only be fitted on a minimum percentage of keys, to those with round key heads of a specific size, whereas they cannot be fitted to keys which the key head may be of a different size or shape, such as, dimple keys whose key head may be larger or rectangular in shape, etc.

For each different type of key, a different identification feature must be manufactured which is not practically feasible due to the vast diversity of the external configuration of the key head shape and dimensions. To date, there is no known way to fit the same distinguishing feature on to hundreds of different key profiles and key types that have different key head shapes and thicknesses.

There was an attempt to solve this problem with colored keys and "art keys" which however are only recognizable by sight and not by touch. Also, the color platting of the key blade quickly fades with time due to the friction caused each time it slides into the lock and therefore it eventually becomes worn and unsightly despite its high purchase cost.

Technical solutions are also suggested in the following documents: GB 2524988 A, JP 2006-271204, DE 10 2005 037799 A1, US 2004/0148988 A1, U.S. Pat. No. 3,797,291, US 2005/0217327 A1, US 2012/0297844 A1, US 2005/0072198 A1, U.S. Pat. No. 3,780,550, JP 9-359694, U.S. Pat. No. 4,901,548, EP 2660411 A2, FR2278882 A1, FR2448607 A1, EP1350910 A1, DE202005014788 U1, BE904684 A, CN106088819A, EP0742330 A1, EP0879929A1, DE102007022300A1, EP0985788A1, EP1154104 A1, FR2882604A3, U.S. Pat. No. 9,771,739 B1. However these documents present a different type of key head which can be adapted only to the unique and specific key types and profiles of each document and does not apply to keys of other brands and other factories, as is the case with the present invention that is applicable on all keys and key types of all manufacturers.

For the second, third and fourth technical problem mentioned above, the current state of the art have no solution to suggest.

BRIEF SUMMARY OF THE INVENTION

In a brief disclosure of this invention is that the invention recommends a method of manufacturing a key with a detachable identification key head. Specifically, this method calls for a key blade modification, of all types, in such manner and shape to allow the key blade to adapt to a detachable identification key head, that is common for all key types and key blades. The invention also concerns the product, which is the detachable identification key head, designed to fit on key types and key blades that have been configured with this method. The invention also concerns a press punch for a press die and a special adaptor-clamp and a milling guide adaptor and an accuracy control tool for testing the correct formation of the key blade.

In short, every key blade, after being cut and formed according to the cutting and forming method with the cutting and shaping tools in a specific shape and size, is then fitted to the detachable identification key head and is secured firmly into it by a special mechanism that it has in a specially formed internal socket.

The advantage of the detachable identification key head invention, is that the same identification key head achieves to adapt itself in all keys and key blades, regardless of the various key types, key profiles, width, shape, length and key cross section. In addition, the external shape of the key head may be manufactured in unlimited designs, shapes, colors and materials therefore making each key unique and easy to distinguish from other keys even by touch. This way the first technical problem, inability of recognizing similar keys that was mentioned above, is solved, as well as the second technical problem of placing the same identification key head on any key type and key profile.

Another advantage is that the detachable identification key head has an extremely lower cost for locksmiths and the rest of key copiers compared to color keys and art keys since it is separated from the key blade and can be placed onto all key types and profiles. Furthermore, the identification key head remains the same in the event that the key blade breaks or the cylinder lock changes, simply because the identification key head is detachable and can be detached from the old key blade and fixed on the key blade of the new key after the cutting and forming process of the new key blade as well.

This, therefore solves the third technical problem concerning high costs and that of changing of the lock results to the discard of the old colored key since the detachable identification key head does not constitute one body with the key blade but is fixed onto the key blade of the user's new key.

Another advantage is that by incorporating a microchip, or another type of electronic system, this enables the use of a two-in-one system, meaning that the key and the microchip are together for all the house keys, which, according to the current state of the art, they do not have some sort of receptor for a microchip or anything else because they are too thin. By this way the fourth technical problem which is the inability to incorporate a microchip or another electronic system onto the house keys of today, is solved.

BRIEF DESCRIPTION OF THE SEVERAL VIEWS OF THE DRAWING(S)

The 16 drawings accompanying the invention, illustrate in brief the following:

FIG. 1a pictures the key before being cut, FIG. 1b shows the key blade after it has been cut and the forming of its end to a truncated pyramid shape along with the detachable identification key head, and a view of the internal of the socket and the locking pin's mounting position, FIG. 1c shows the key blade plugged in the identification key head, FIG. 1d shows an internal view of the socket and the exterior of the detachable identification key head. Dotted lines are used in the drawings to illustrate the technical details that are not visible in the interior of the key head.

FIGS. 2a-2f show the cutting of the key head into a certain shape, which is accomplished by a press punch for press die of the current state of the art. More specifically, FIG. 2a shows the key before being cut. FIG. 2b shows key being cut, FIGS. 2c and 2d show the key after it has been cut, FIG. 2e shows the die block, and FIG. 2f shows the press punch.

FIG. 3a shows the steps of the cutting stage of the key head into a particular shape, with the use of a key cutting machine of the current state of the art along with a guide adaptor and an adaptor-clamp in a horizontal position, FIGS. 3a, 3b, and 3c show a firm fixing of the key on the adaptor-clamp, and FIGS. 3f and 3g show the cutting of the key head in accordance with the guide adaptor. FIG. 3h shows the key blade after the key head has been cut. FIGS. 3d and 3e show the adaptors from a side view and while in a horizontal position.

FIGS. 4a, 4b, 4c, 4f, and 4g, show the steps of the milling stage of the end of the key blade in the shape of a truncated pyramid, using a key cutting machine of the current state of the art, along with the guide adaptor and the adaptor-clamp in tilted position and then the pin groove milling of the key blade. FIG. 4h shows the key blade in its final form before being fixed to the key head of this invention. FIGS. 4d and 4e show the adaptors from a side view in a tilted position.

FIGS. 5a-5g show an accuracy control tool for testing the correct formation of the key blade, for control of proper cutting and milling.

FIG. 6a shows in detail the guide adaptor pieces that includes the pattern FIG. 6b shows the mounting base in perspective view. FIG. 6c shows a horizontal position side view. FIG. 6d shows a cross-section thereof in detail transverse to the middle of the part. FIG. 6e shows a side view at tilted position. FIG. 6f shows a cross-section thereof in detail transverse to the middle of the part. FIG. 6g shows the guide adaptor in vertical view and in detail. FIG. 6h shows the adaptor in perspective view and in detail.

FIG. 7a shows in detail the pieces of the adaptor-clamp in perspective view. FIG. 7b shows the same in a side view in a horizontal position and tilted position. FIG. 7c shows the same in a cross-section horizontal position detail view, and FIG. 7d shows the same in a cross-section tilted position detail view. FIG. 7e shows the adaptor-clamp disassembled, i.e., the flat bar, mounting base, hinge joint, locking pin and the key holder clamp with the frame and the slider.

FIG. 10a shows the key blade and the detachable identification key head with a view of the interior of the socket and the locking pin position. FIG. 10b shows a break section view of the interior of the key head. FIG. 10c shows a side section view of the key blade and the identification key head and, in detail. FIG. 10c shows the same before being fixed, and FIG. 10d shows the same after it has been fixed. FIGS. 10a and 10b also show the horizontal and vertical holes for the key ring.

Figure 11A:
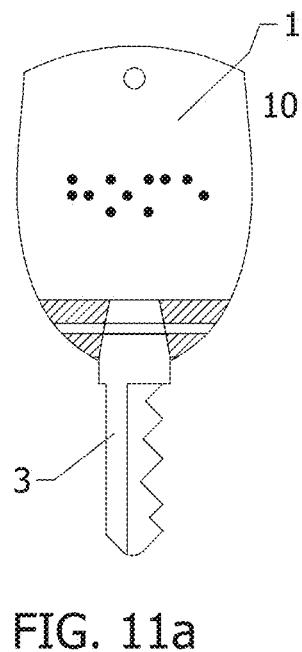
Figure 11B:
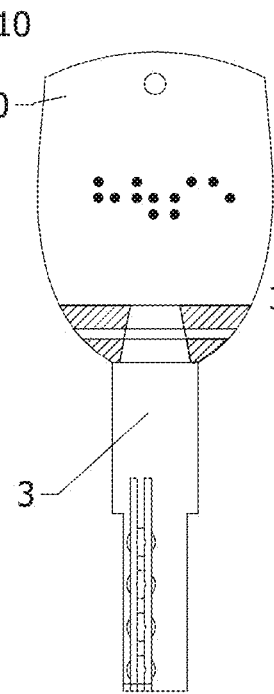
Figure 11C:
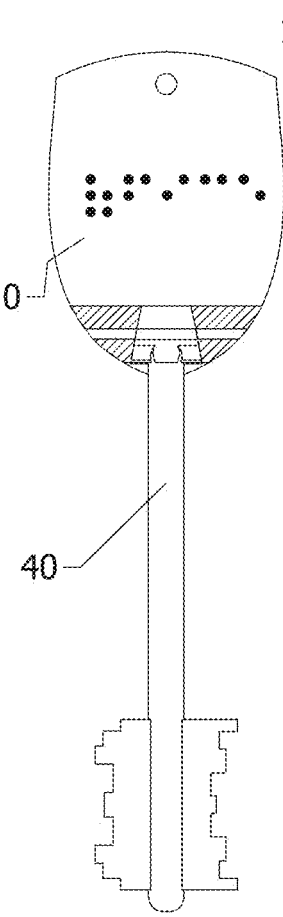
Figure 11D:
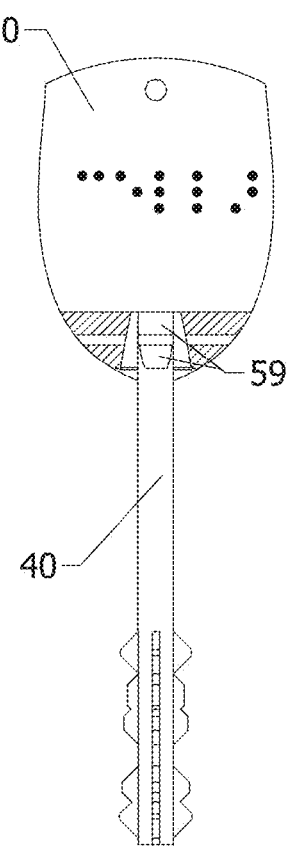
Figure 11E:
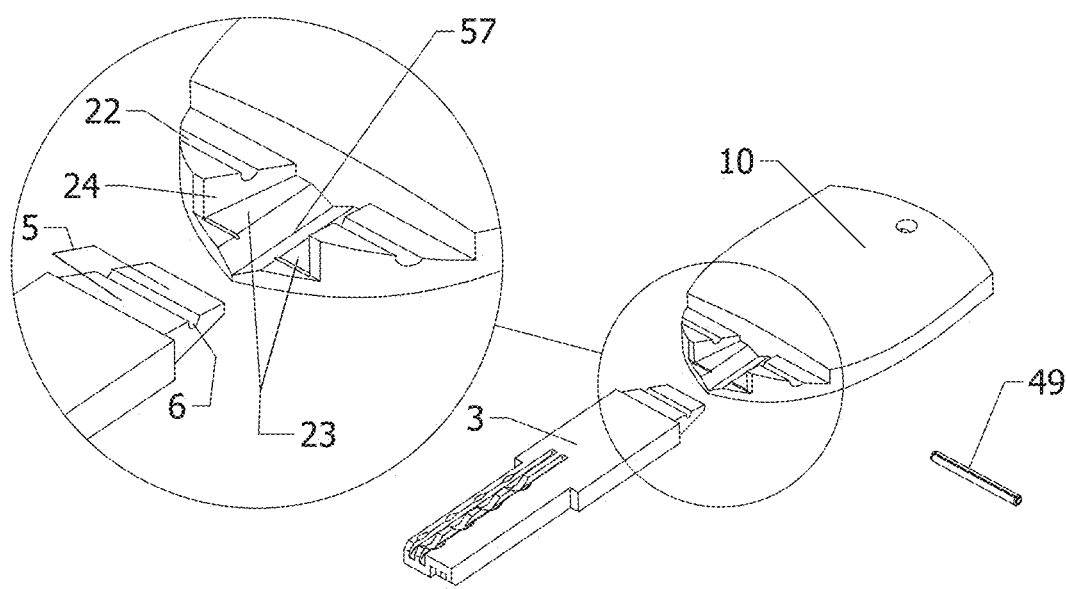

FIGS. 11a-11d show a break section view of many different key blade types placed inside the same detachable identification key head. FIG. 11e shows a break section view of the interior of the key head and in detail and locking pin position, and also placement of a discreet mark on the identification key head, written in Braille script (FIGS. 11a-11d words: HOME, HOUSE, OFFICE, CELLAR show in order).

FIGS. 12a-12d show a perspective view and a cross section side view and in detail of many different key blades types, placed within the same detachable identification key head.

Figure 13A:
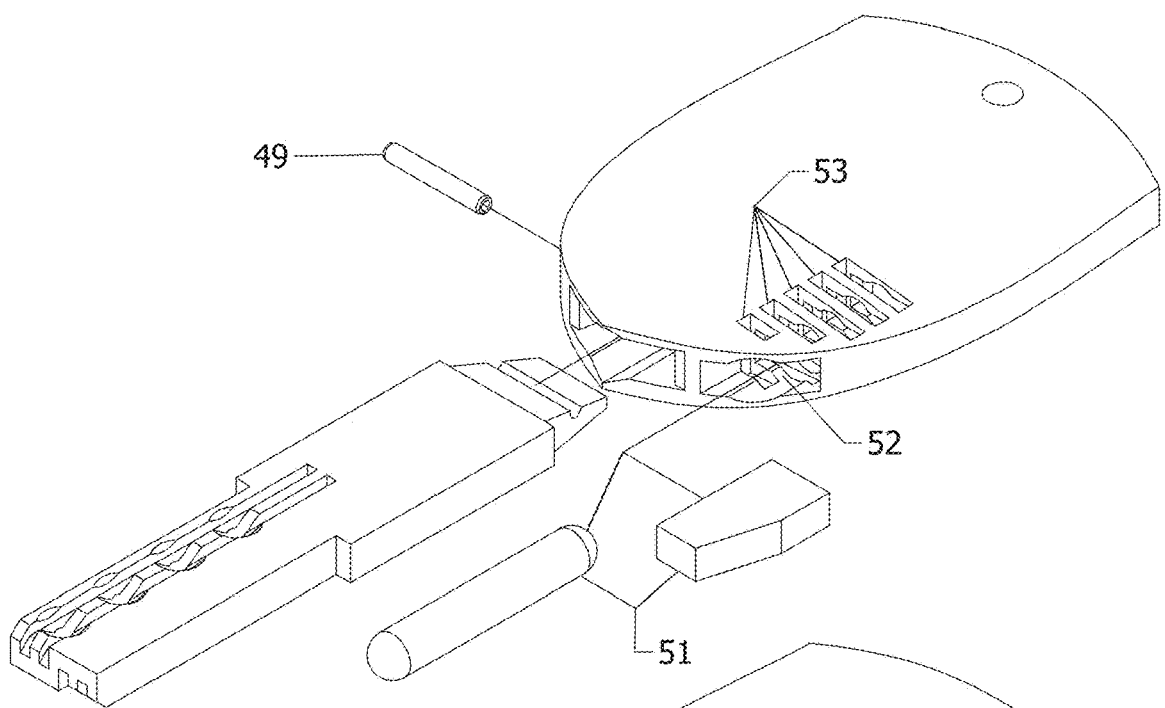
Figure 13B:
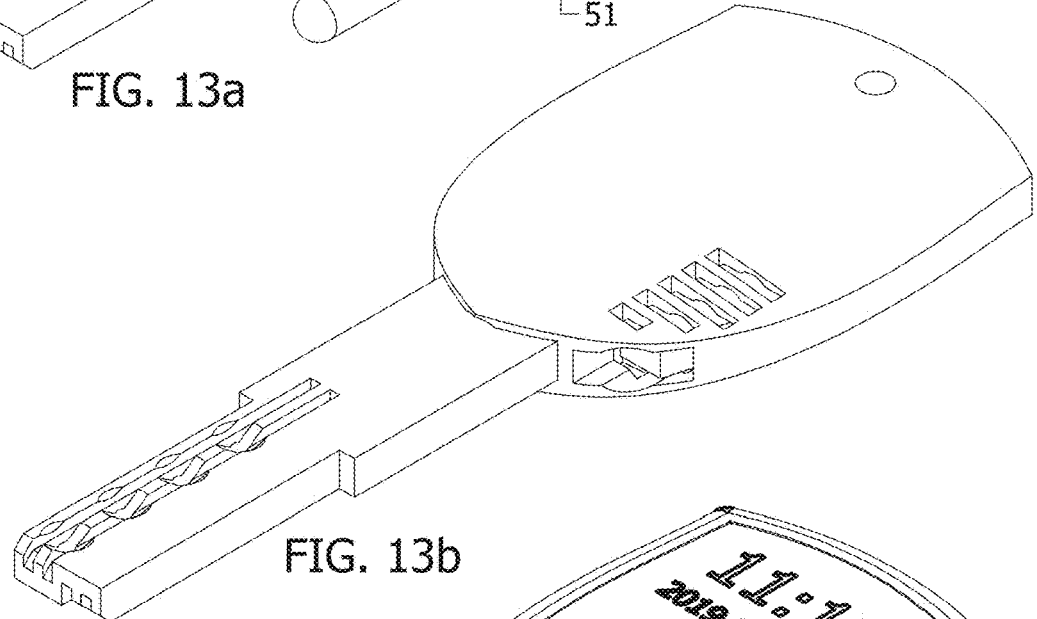
Figure 13C:
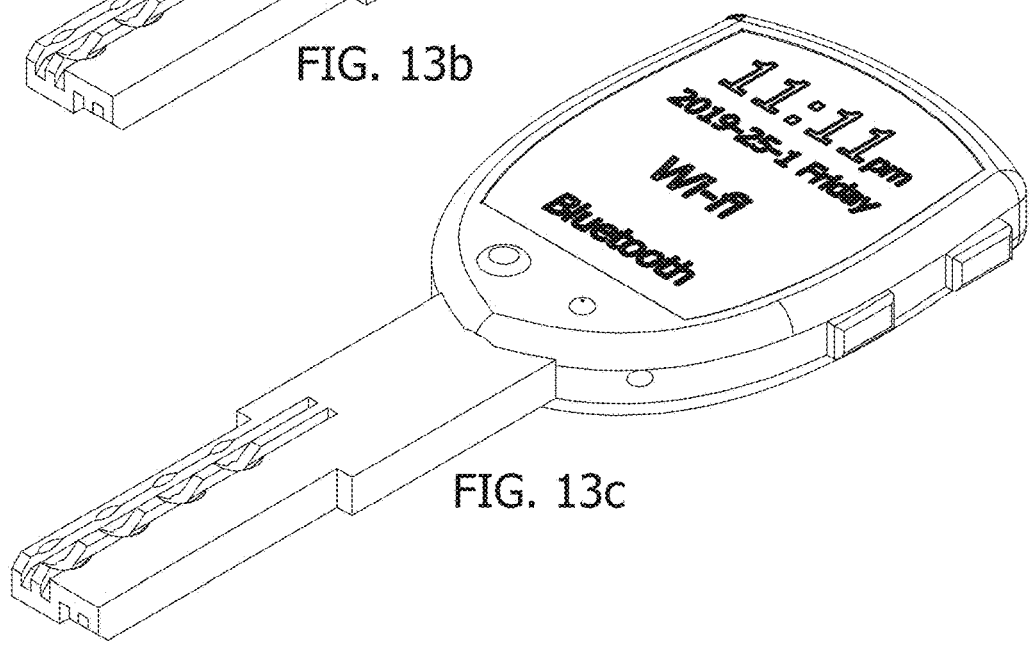

FIGS. 13a and 13b show the detachable identification key head with a microchip mounting pocket, FIGS. 13c shows the detachable identification key head with a built-in smart watch.

FIGS. 14a and 14g show the fixing of special key types onto the detachable identification key head. FIGS. 14e-14f show use of adaptor A, and FIGS. 14h and 14k-l show use of adaptor B. FIGS. 14d-14d show the adaptor A in perspective view and in detail, FIG. 14i shows adaptor B in perspective view, and FIG. 14i shows the same in front view and in detail.

Figure 15:
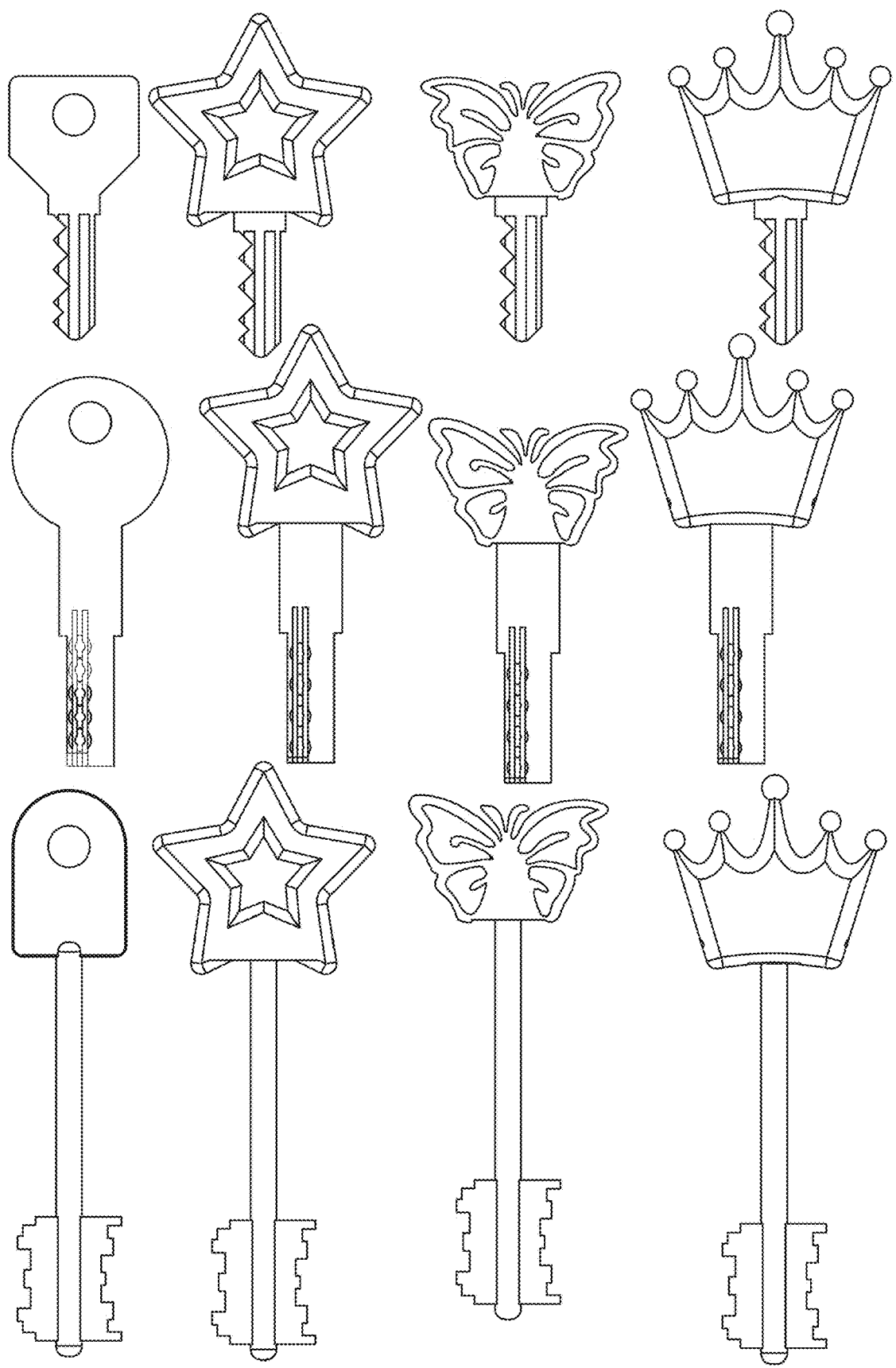

FIG. 15 depicts the same detachable identification key head, fixed on key blades of different types and dimensions.

Figure 16:
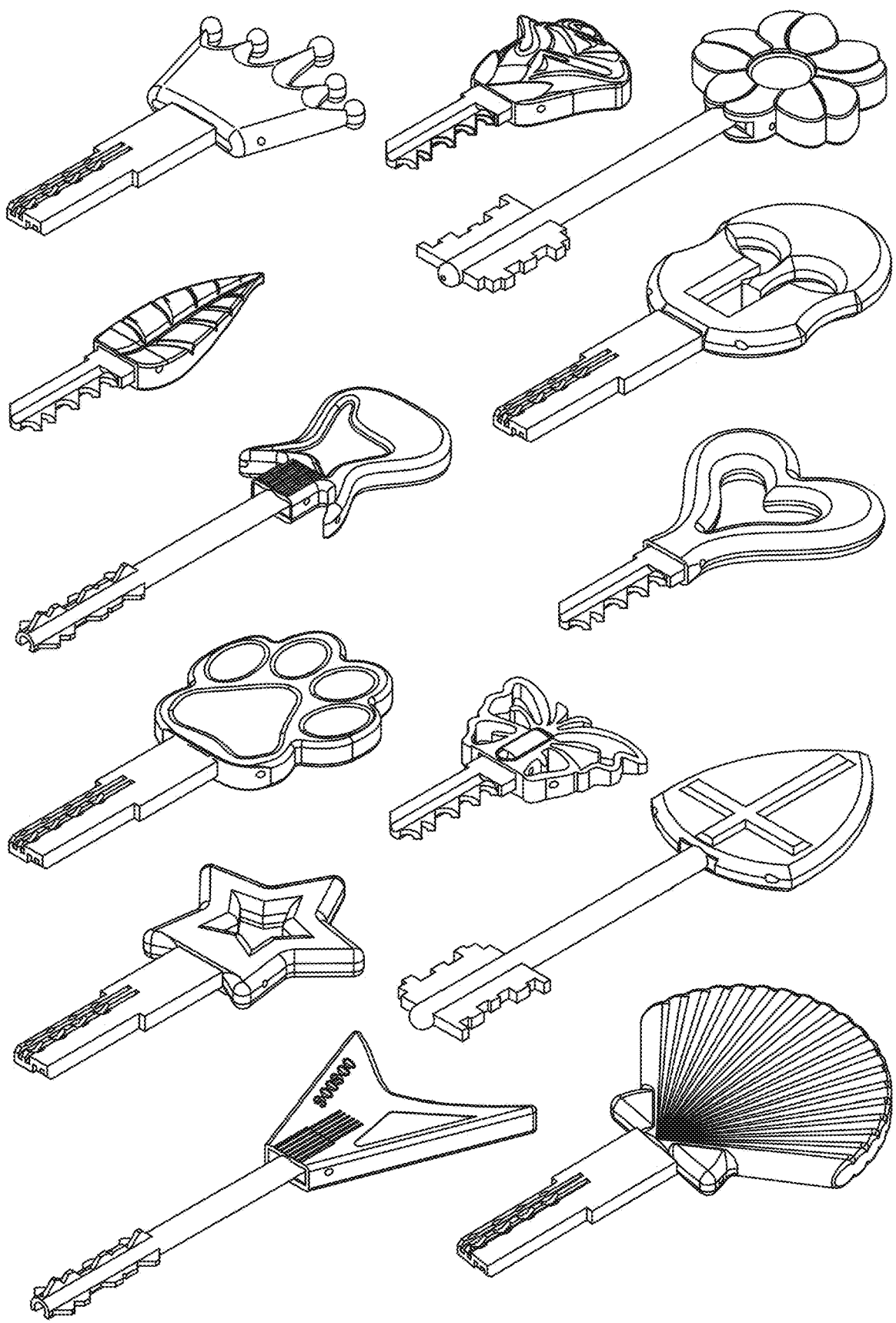

FIG. 16 illustrates various forms that can be given to the exterior shape of the detachable identification key head, adapted to any type of key blade.

A detailed description of the key construction method follows, with detachable identification key head, key blade configuration and the invention of the detachable identification key head, with a non-limiting example and by reference to the attached drawings, which illustrate a form of execution of the object of this invention.

Figure 8A:
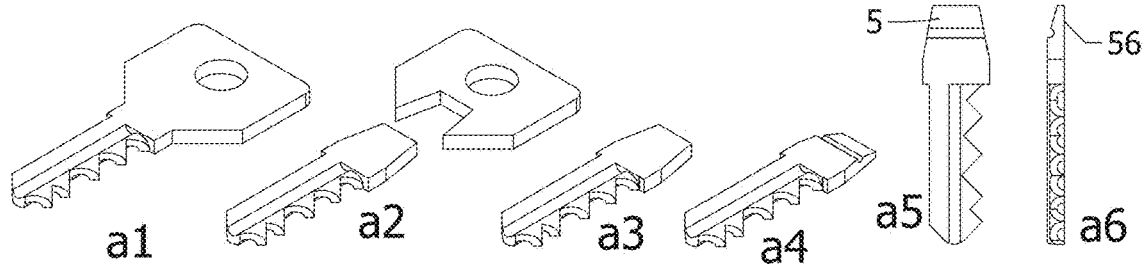
FIGS. 8a-8d show cutting stages of various key types, indicatively, in perspective view, vertical view, and in side view, until the key blades are totally formed in order to be fixed on the detachable identification key head.
Figure 8B:
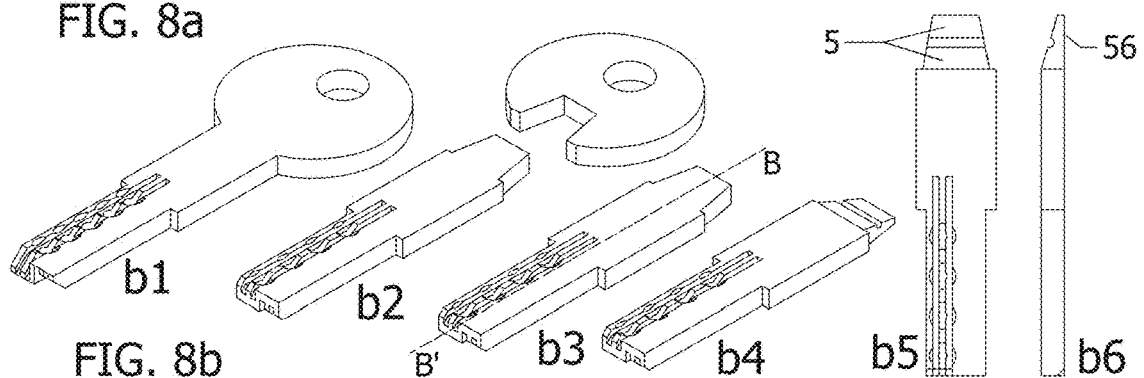
Figure 8C:
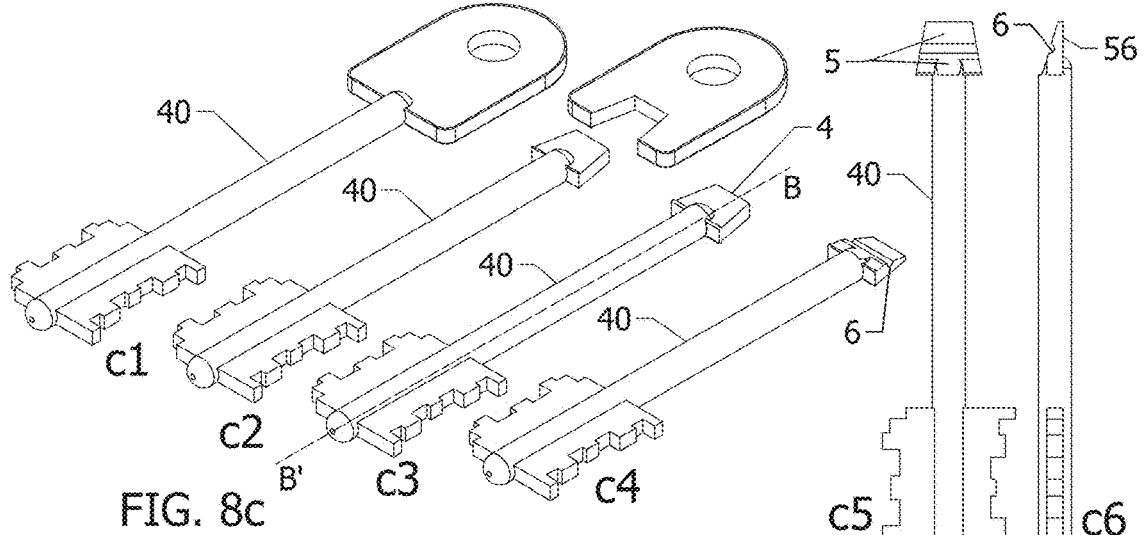
Figure 8D:
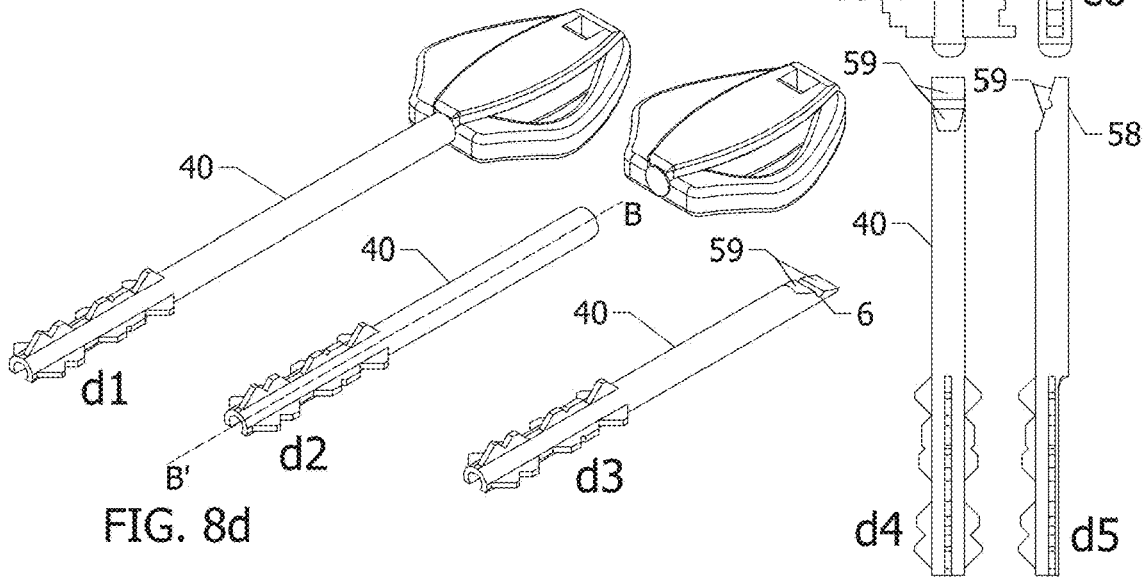

In the present state of the art, each key (1) has a key head (2) and a key blade (3) with a flat neck (7) (FIGS. 8a and 8b) or a cylindrical stem (40) (FIGS. 8c and 8d). The invention refers to a detachable identification key head (10) of a key (1), which adapts to the part of the key head that remains on the flat neck (7) of the key blade (3) or the cylindrical stem (40) of the key blade (3) when applying this method. The key blade (3) is cut off from the factory-key head (2) of the key and formed with the following specific method. Throughout the description, and where nothing else is indicated, the key blade (3) constitutes the part that includes the key neck (7) or the stem (40) and the portion of the key head that remains on the flat key neck (7) of the key blade (3) (FIGS. 8a3-α6, 8β3-β6) or on the cylindrical stem (40) of the key blade (3) (FIGS. 8c3-c6, 8d2-d5) when this method is implemented.

In particular, as illustrated in FIGS. 1-5, the key construction method with a detachable identification key head, with the key blade (3) formation, forms the end of the neck of the key blade (3) to an irregular truncated pyramid shape, so that the key blade fits exactly into the socket (20) of the detachable identification key head (10) and to rest at the bottom (25) at the end of the socket. The process is performed in three stages, which in summary are the following:

First step: cutting off the factory key head (2) from the key blade (3) of the key in a trapezoidal shape (4) (FIGS. 1, 2, and 3).

Second step: slope milling of the upper side of the key blade end, to a chamfer (5) forming the key blade's end to an irregular truncated pyramid shape, pin groove (6) milling and testing thereof (FIGS. 4-8).

Step Three: fitting the key blade (3) of the key, either with a flat neck (7) or a cylindrical stem (40), to the detachable identification key head (10) and fixing it (FIGS. 1, 9, 10, 11, 12, 13, 14).

For implementing this method, a press die (69), a formation accuracy control tool (17), a guide adaptor (11) and an adaptor-clamp (8) are used, the technical characteristics of which are described after the method description.

In detail:

First stage (FIGS. 1, 2, 3): cutting off the factory key head (2) from the key blade (3) of the key (1) into an isosceles trapezoidal ending.

In the case of a key blade (3) with a flat neck (7) (FIGS. 1a, 2a, 3a), the key blade (3) with a part of the key head, is cut off from the (remaining) key head (2) in a trapezoidal end (4), with a vertical cross cut perpendicular to the surface of the key blade. The two lateral sides (61, 62) (FIGS. 2d, 3h) are equal and converge with each other. The shape of the isosceles trapezoidal end (4) is specified by the small base of the trapezoidal end at the end of the key blade (3), in the portion of the key head that remained attached to the neck (7), while as depicted in FIGS. 2d, 8b3, 8c3, the large base of the trapezoidal shape lies on the notional line where the key head (2) connects to the neck (7) and the notional axis passing perpendicularly through the center of the small and large base of the trapezoidal end (4), is aligned with the notional longitudinal B-B' axis of the key blade (3).

Cutting can be done with a press die (69) of the current state of the art (FIG. 2, FIGS. 2a-2f), using a specially designed press punch with the desired trapezoidal shaped end described below, or with any other cutting technique of the current state of the art, such as electronics CNC machines, always to the same trapezoidal ending shape (FIG. 4h). The press die (69) has a die block (68) (FIG. 2e) formed at the cutting point with a trapezoidal shape (63) that the key blade (3) will be cut, and a centering groove (64) in the middle, along its longitudinal axis to adjust the keys with a key blade (3) with a cylindrical stem (40). The press punch (70) (FIG. 2f) has the same trapezoidal shape for cutting but also additional 3 sloped V-grooves (65), that is, a V-groove on each cutting side of the trapezoidal shape. Due to this shaping, the press punch (70) at the cutting point has four contact points (66) (FIG. 2f), which push and lock the key on the die block (68). When cutting, the four contact points

(66) at the edges of the V-grooves end up at three points at the vertices of the V-groove (67). So, throughout the cutting process the key is clipped to the desired trapezoidal ending without torsional tension and with the minimum possible pressing force.

Alternatively, when applying the method illustrated in the attached FIGS. 3 and 4, the key cutting is made to the existing laser and dimple key cutting machines of the current state of the art, not with a press cutter, but using the components of this invention which are a guide adaptor (11) and adaptor-clamp (8).

In particular, the existing laser and dimple key cutting machines have two small, left and the right clamps for fixing the keys. When applying today's state of the art, on the left clamp, that the tracer is, the functional key that is to be copied is placed and on the right clamp, that the cutting means ("milling cutter") are, the new key blank to be machined and copied according to the functional key is placed.

Figure 2A:
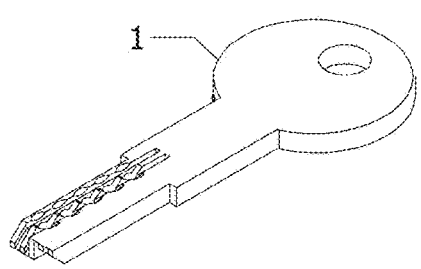
Figure 2B:
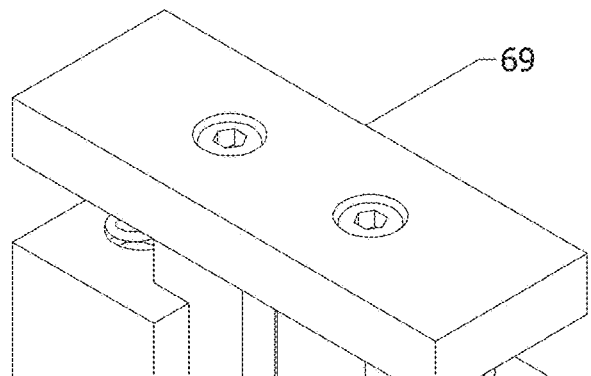
Figure 2D:
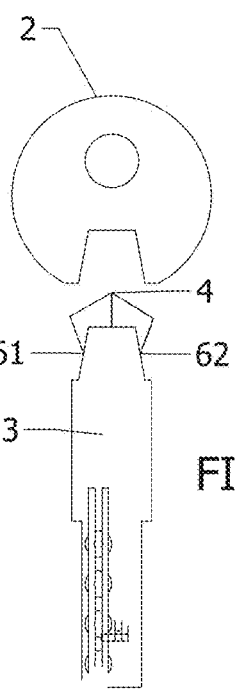
Figure 2C:
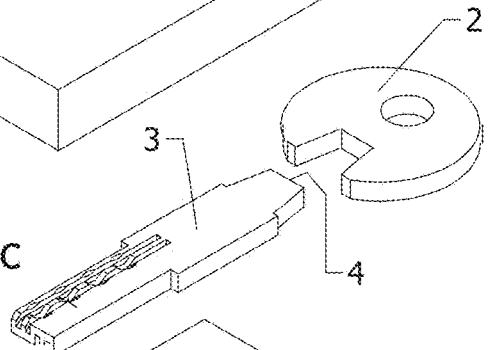
Figure 2E:
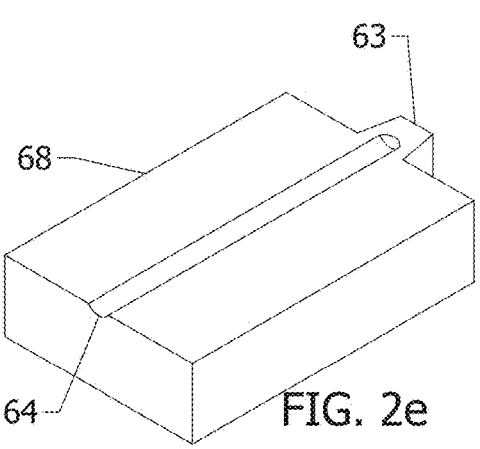
Figure 2F:
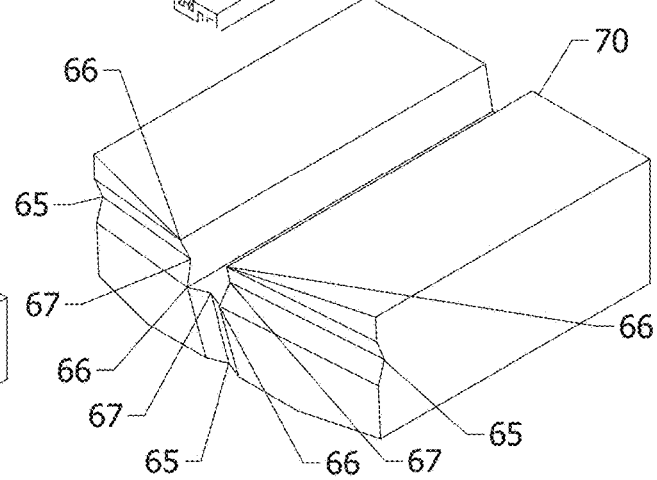
Figure 3A:
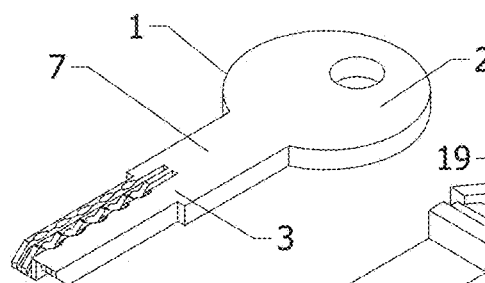
Figures 3B, 3C:
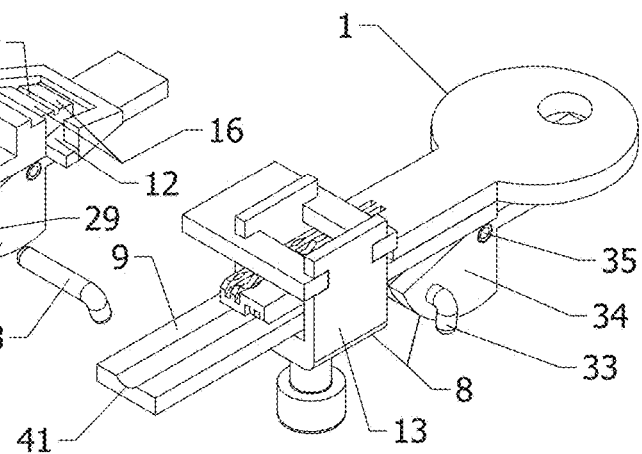
Figure 3D:
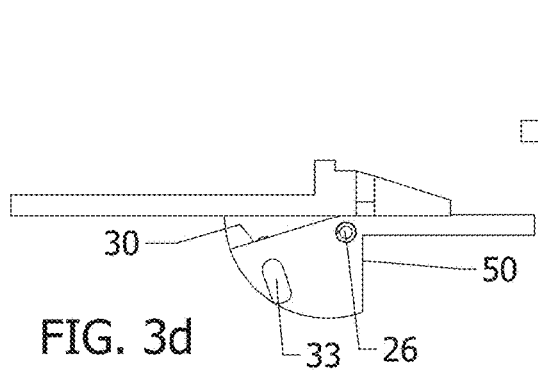
Figure 3E:
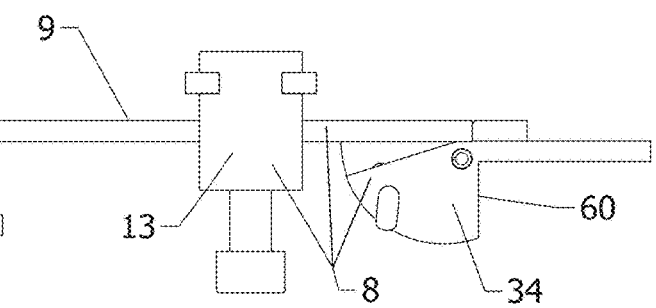
Figure 3F:
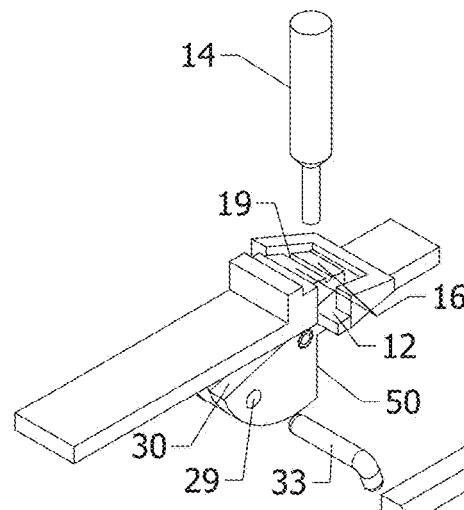
Figures 3G, 3H:
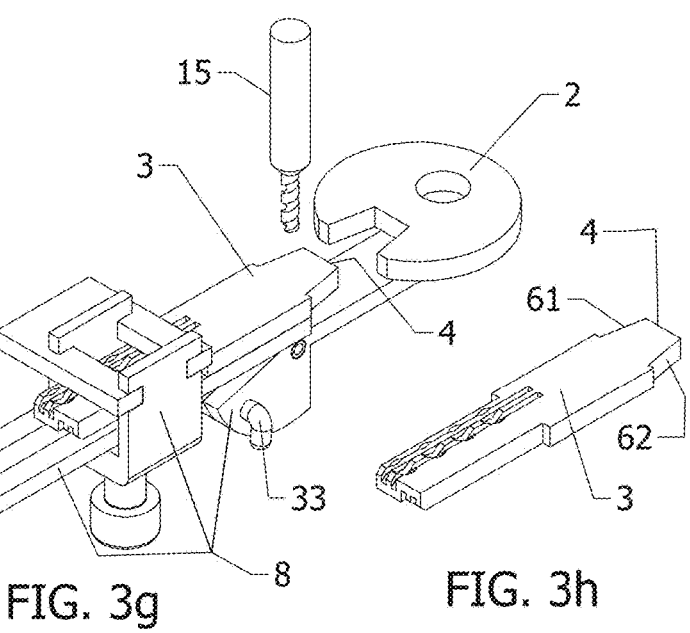

In order to cut a key (1) with a key blade (3) with a flat neck (7) according to this method (FIG. 3a), a guide adaptor (11) is used on the left clamp (FIG. 3b, 3d, 3f, 4b, 4d, 4f) having a guide slot (12) of isosceles trapezoidal shape and of rectangular cross section, and an upper side chamfer (16) with a guide groove (19) (FIGS. 3b, 3f, 4b, 4f, 6g, 6h). In the right clamp, an adaptor-clamp (8) is used (FIGS. 3c, 3e, 3g, 4c, 4e, 4g) for cutting the key blade (3) of the key (1) to the desired isosceles trapezoidal ending (4). Both the guide adaptor (11) and the adaptor-clamp (8) are mounted to horizontal position (FIGS. 3b-3g). The key (1) is mounted on the flat support bar (9) of the adaptor-clamp (8) (FIG. 3c), tightened and fixed with the key holder clamp (13) in such a position that the milling cutter (15) (FIG. 3g) of the key cutting machine, following the tracer (14) of the key cutting machine along the trapezoid-shape guide slot (12) (FIG. 3f) of the guide adaptor (11), cuts off the key head (2) of the key (1) from the key blade (3) (FIG. 3g). The end of the key blade (3) is shaped now to a trapezoidal end (4) (FIG. 3) with two equal lateral sides (61) (62) converging with each other (FIGS. 2d, 3rd).

In the case of a key where the key blade (3) has a cylindrical stem (40) (FIGS. 8c, 8d, 11c, 11d) such as, for example, the single bit or double bit key, etc., the cutting process can be followed in two alternative ways:

The first way is to follow the same cutting process described in detail above for keys with a key blade (3) and a flat neck (7) (FIG. 1a) with a guide adaptor (11) and an adaptor-clamp (8), meaning that the key blade (3) of the key with a cylindrical stem (40) is centered on a centering groove (41), is fixed with a key holder clamp (13), the milling cutter (15) (FIG. 3g) of the key cutting machine following the tracer (14) of the key cutting machine on the trapezoidal shaped route of the guide slot (12) (FIG. 3f) cuts one part of the key head (2) of the key and leaves the cylindrical stem (40) with the rest portion of the key head with a trapezoidal ending (4) (FIG. 8c3).

The second way, alternatively, is to cut off the key head directly from the stem (FIG. 8d2), that is, a vertical transverse cut on the cylindrical part of the stem (40) and not on the key head (2), without forming a trapezoidal ending. The vertical cut on the stem is made by using the guide adaptor (11) and the adaptor-clamp (8), or directly on bit/double bit key cutting machine of the current state of the art, or even manually with a grinder or saw.

Second step (FIGS. 4, 5, 6, 7, 8): milling to a chamfered end (5) on the top side of the key blade (3) end, of the key (1), forming the key blade end to an irregular truncated pyramid shape. A pin groove (6) (FIGS. 4g-4h) is milled and an accuracy control testing of the correct formation is being made (FIGS. 5a-5g).

Tilt milling can be done in two ways, selectively:

As illustrated in FIGS. 4, 5 and 8, in case of a key with a key blade (3) with a flat neck (7), the guide adaptor (11) and the adaptor-clamp (8), always fixed on the clamps of the key cutting machine, lock to the tilted position with the use of a dowel (33) and milling is done on the upper side of the key blade (3) end, forming a chamfer (5) alike the chamfer (16) of the guide adaptor (11) (FIGS. 4f, 4g). On the upper side with the chamfer (5) of the key blade (3), a pin groove (6) is milled vertical to the notional longitudinal B-B' axis of the key blade (3) (FIG. 8b3), according to the guide groove (19) of the guide adaptor (11) (FIGS. 4f, 4g). Finally, an accuracy control checking is being done, of the trapezoidal end (4), chamfer (5) and pin groove (6) with the accuracy control tool (17) (FIG. 5) described below.

In the same way, if there is a single bit or a double bit key etc. that the key blade (3) has a cylindrical stem (40), and a trapezoidal ending (4) at the end part of the key head (FIGS. 5a, 5c, 5e, 8c3, 11c), exactly the same procedure is followed. The key with the cylindrical stem (40) after cutting of the key head, is still mounted and fixed on the centering groove (41) of the flat support bar (9) of the adaptor-clamp (8). The upper side of the part of the key head with the trapezoidal end (4) (FIGS. 5a, 5c, 8c3) is milled to a chamfer (5) (FIGS. 5e, 8c4, 8c5, 8c6) forming the trapezoidal end to an irregular truncated pyramid shape. From the center of the cylindrical stem (40) of the key blade (3) and passing along it a B-B' axis (FIG. 8c3). Then, the pin groove (6) is milled on the chamfer (5) according to the guide groove (19) of the guide adaptor (11) (FIGS. 4f, 4g), in a position perpendicular to the notional longitudinal B-B' axis of the cylindrical stem (40) of the key blade (3) (FIGS. 8c4, 8c5, 8c6).

Similarly, if it is a single bit or a double bit key etc., with a cylindrical stem, where the vertical cross cutting has been made on the cylindrical stem (40) and not on the key head, meaning it does not have a trapezoidal shape end (FIG. 8d2), it is mounted and fixed on the centering groove (41) of the flat support bar (9), and a chamfer (59) is milled on upper side at the end of the stem (40) according to the guide adaptor (11) (FIGS. 8d3, 8d4, 8d5, 11d). From the center of the cylindrical stem (40) of the key blade (3) and along it, there is a notional B-B' axis (FIG. 8d2). Then the pin's groove is milled (6) (FIG. 8d3) on the chamfer (59) of the cylindrical stem (40) in a position perpendicular to the notional longitudinal B-B' axis of the cylindrical stem (40) of the key blade (3), according to the guide groove (19) of the guide adaptor (11) (FIGS. 4f, 4g).

Alternatively, for the implementation of this method, the forming of the key blade (3) end into a trapezoidal (4) and chamfered end (5), whether it is a flat neck (7) or a cylindrical stem (40), may be done with the accuracy control tool (17) described below, using a grinder or a file of the current state of the art by hand, without the use of the guide adaptor (11) and the adaptor-clamp (8), because the accuracy control tool (17) has a recess (18) geometrically and dimensionally identical to the dimensions of the irregular truncated pyramid of the socket (20) of the detachable identification key head (10), within which the key blade (3) ending formation must exactly fit.

The key blade (3) is positioned in the middle of the flat bar (48) of the accuracy control tool (17) and an accuracy control testing of the irregular truncated pyramid shape of the key blade (3) end is being made, and the points which require corrections are recognized (FIGS. 5a, 5b). The key blade (3) is shaped to the correct dimensions when the trapezoidal end (4) of the key blade (3) fits exactly into the trapezoidal shape of the recess (18) of the protrusion (47) (FIGS. 5a-5d) of the accuracy control tool (17) and the chamfer (5) of the key blade's (3) upper side is at the same plane with the upper side chamfer (16) of the protrusion (47) and the pin groove (6) of the key blade (3) is perfectly aligned with the guide groove (19) and of equal depth thereto (FIGS. 5e, 5g).

The key holder clamp (13) of the adaptor-clamp (8) can be also adapted to the accuracy control tool (17) (FIG. 5), in order to fix and stabilize the key blade (3) and be used in the same way as described above.

In all cases of chamfer milling (5) at the second step of the process, the underside of the key blade's (3) ending, whether has a flat neck (7) or a cylindrical stem (40), is not machined at all, and remains flat (56) (FIGS. 8a6, 8b6, 8c6) or cylindrical (58) (FIG. 8d5), respectively.

Third stage (FIGS. 1, 9, 10, 11, 12, 13, 14): mounting the key blade (3) to the detachable identification key head (10) and fastening and securing therein.

In particular, as illustrated in FIGS. 1 and 9, 6, 10, 11, 12, 13, 14, the detachable identification key head (10) has a socket (20) (FIG. 1b) that forms a cavity (96, FIG. 9b) of an irregular truncated pyramid shape with its large rectangular and parallel base (90, FIG. 9c) at the entrance of the socket (20) and the small rectangular and parallel base (25) at the bottom of the socket (FIGS. 9a-9c), and in a vertical view the lower horizontal side surface (23) (FIGS. 9a, 9b, 11e) of isosceles trapezoidal shape perpendicular to the bases of the pyramid. The two equal side surfaces (24) are rectangular trapezoid in shape and converge with each other to the bottom of the socket. The upper side surface (21) is of isosceles trapezoid shape and converges to the lower horizontal side surface (23) to the bottom of the socket, i.e. the dimensions of the cross section of the socket (20) decrease towards its depth.

Also, the socket (20) on the center of the lower horizontal side surface (23) and along bears a centering groove (57) from the center of which an A-A' axis (FIG. 9a) passes through. Also the detachable identification key head (10) bears a through hole (22) (FIGS. 1b, 9a) at least partially passing through the two equal lateral side surfaces (24), right and left, of the socket (20), and the inclined upper side surface (21) of the socket (FIG. 9b), creating a semi-cylindrical groove (92, FIG. 9c) on the inclined upper side surface. From the center of the through hole (22) a C-C' axis passes through, perpendicular to the A-A' axis of the centering groove (57) of the lower horizontal side surface (23) of the socket (20) (FIG. 9a).

Figure 9A:
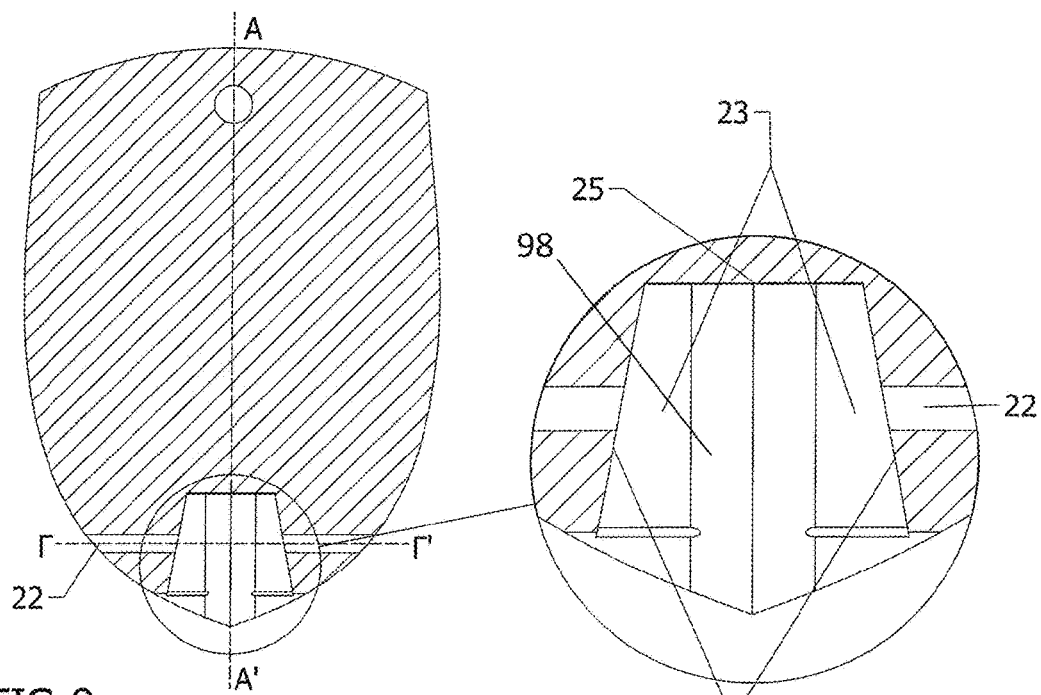
FIGS. 9a shows a vertical cross-sectional view of the detachable identification key head and in detail.
Figure 9B:
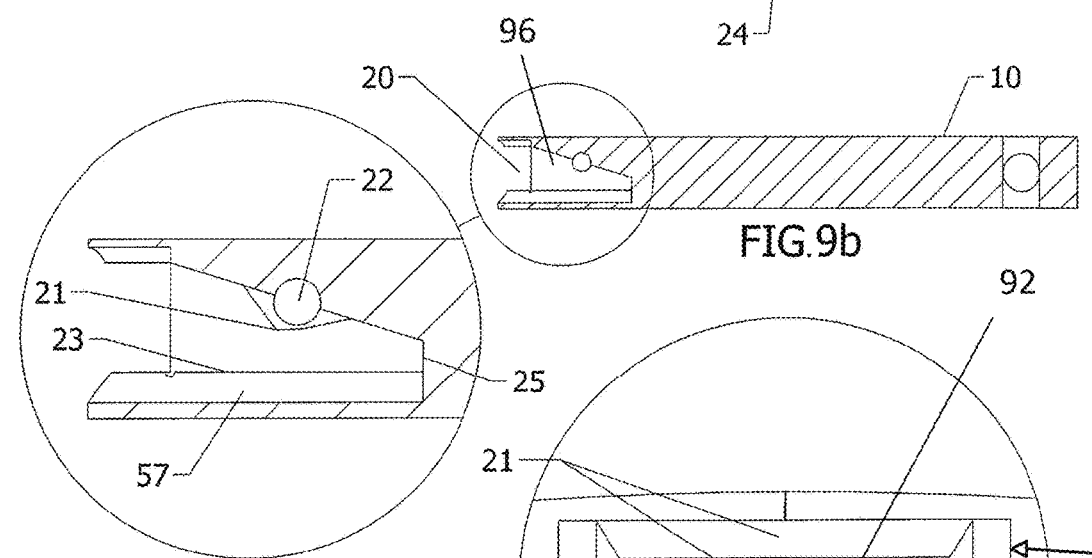
FIG. 9b shows a cross-sectional side view and in detail.
Figure 9C:
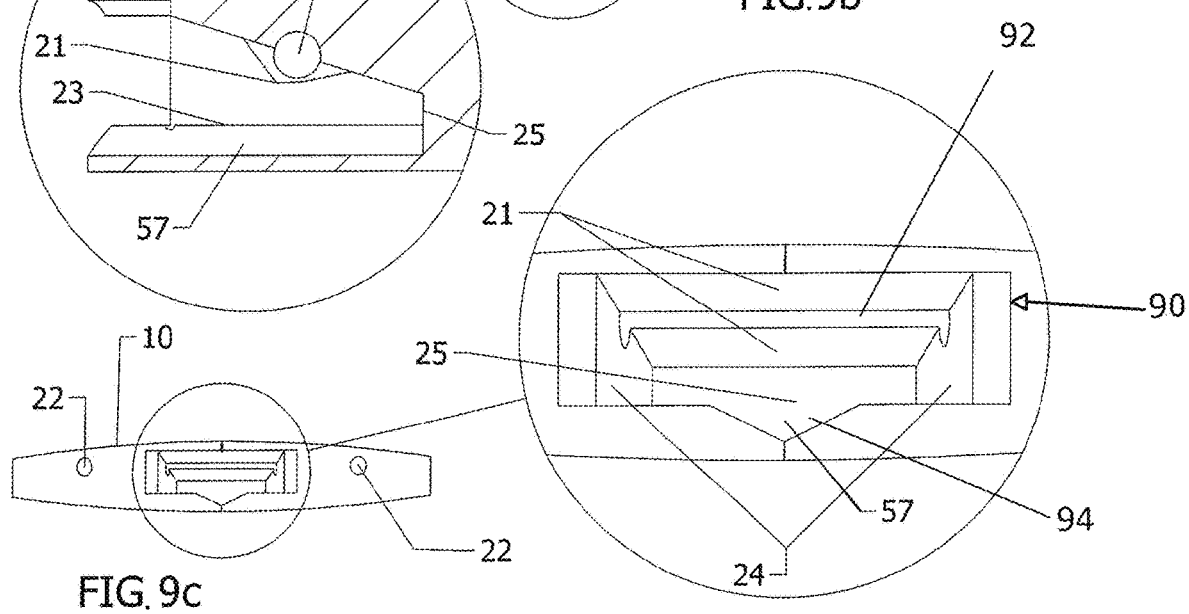
FIG. 9c shows a front view and in detail.

The dimensions of the trapezoidal (4) and chamfered end (5) of the key blade (3) end to an irregular truncated pyramid shape are the same as the dimensions of the irregular truncated pyramid of the socket (20) so as to fit exactly into the socket (20) of the identification key head (10) and rest at the end of the bottom (25) of the socket, including a centering ridge 94 (FIG. 9c) that slides in the centering channel (57), the base portion (100) fitting in the entrance (20) of the socket, the top (98) mating with the upper side surface (21), the second base (106) abutting the small base (25), and the groove or fastener channel (104) aligning with the through hole (22), as shown in FIGS. 9a, 9b, and 9c. The end of the formed key blade (3) with the trapezoidal (4) and the chamfer (5) to an irregular truncated pyramid shape, is placed by sliding within the socket (20), with ridge 94 sliding along fastener channel 98 (FIG. 9a) of the cavity 96, with the detachable identification key head (10) with its flat underside (56) in tangential contact with the lower horizontal side surface (23) of the socket of the detachable identification key head (10) (FIGS. 10c, 10d, 12a-12b). At the same time, the two converging lateral sides of the trapezoidal end (61 and 62) (shown as 102 in FIG. 6h) of the key blade (3) and the chamfer (5) of the upper part of the key blade, become in tangential contact with the two equal lateral side surfaces (24) and the upper side surface (21) of the socket (20) (FIGS. 11a-11b) accordingly with the key blade's (3) thickness, for example, 3.5 mm key blade (FIG. 12a), 2 mm key blade (FIG. 12b), etc. The key blade (3) rests at the bottom (25) at the end of the socket (20), wedges and is fastened therein (FIGS. 11a-11b, 12a-12b), with the flat underside (56) of the key blade in tangential contact with the lower horizontal side surface (23) of the socket (20).

The same mounting procedure is followed for a single bit or double bit key, etc., with a key blade (3) having a cylindrical stem (40) and trapezoidal end (4) and a chamfer (5) at the end of the key head part (FIGS. 8c4-8c6, 11c, 12c). Additionally, a small portion of the cylindrical stem (40) of the key blade (3) is inserted slightly into the centering groove (57) of the socket (20) of the detachable identification key head (10) and thus, the flat underside (56) of the key blade (3) end, remains at the same plane with the lower horizontal side surface (23) of the socket (20) and in tangential contact with, as described above (FIGS. 11c, 12c). In this case, the key blade (3) rest at the bottom (25) at the end of the socket (20) (FIGS. 11a-11b), wedges and is fastened therein.

Figure 12A:
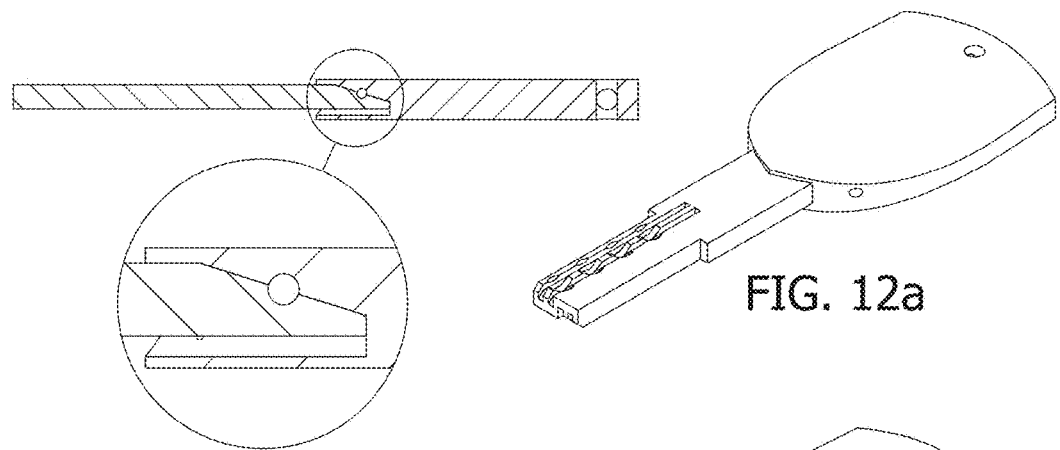
Figure 12B:
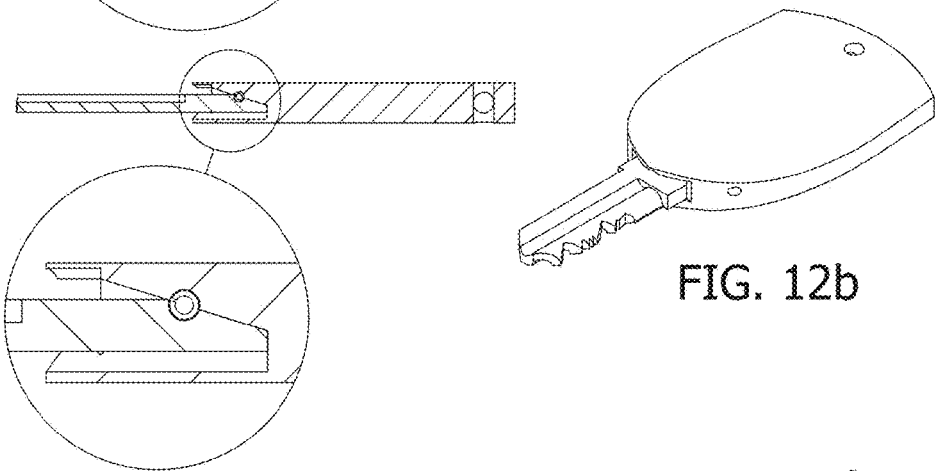
Figure 12C:
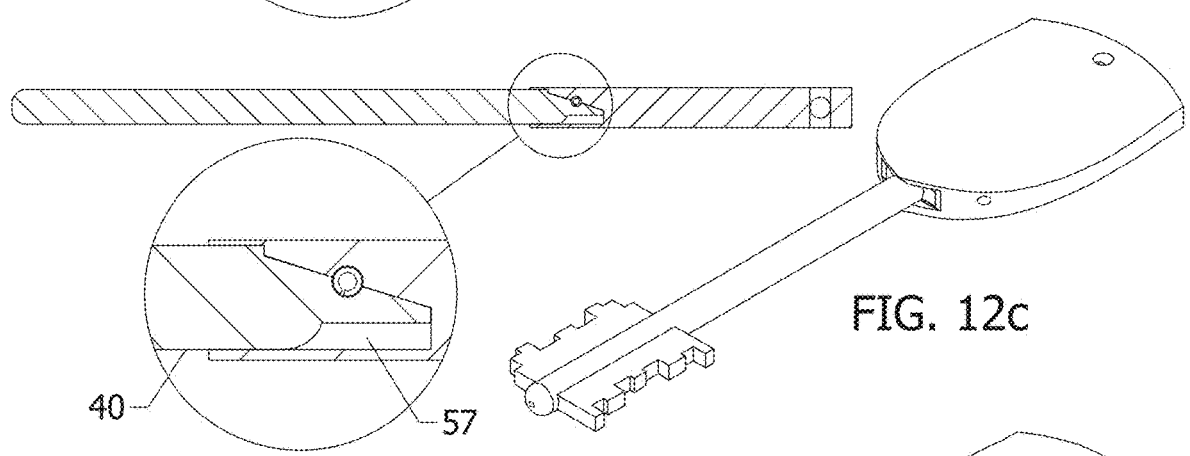
Figure 12D:
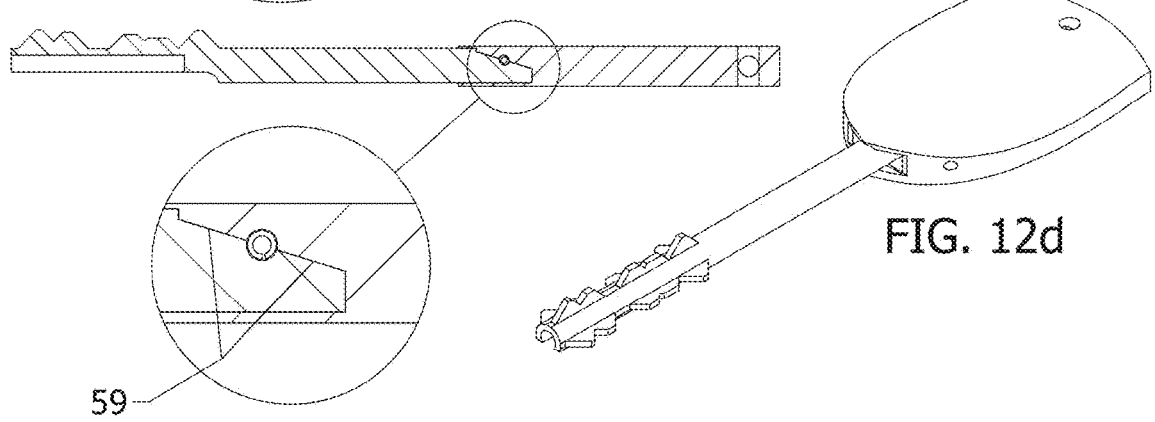

In the case of a single bit or double bit key etc. that the vertical cut has been made on the cylindrical stem rather than the key head (FIGS. 8d3-8d5, 11d, 12d) and therefore has no trapezoidal end (4) but only a chamfer (59) configuration, enters and slides with its lower cylindrical side (58) (FIG. 8d) in tangential contact with the centering groove (57) that is located at the center and along the lower horizontal side surface (23) of the socket of the detachable key head (10). As the stem reaches the bottom (25) in the end of the socket, the chamfer (59) of the stem (FIG. 8d3-8s5) also slides and become in tangential contact with the inclined upper side surface (21) of the socket (20) and thereby the cylindrical stem (40) of the key wedges into the centering groove (57) of the socket (20) and immobilizes therein (FIGS. 11d, 12d).

In all the above three cases where the key blade (3) rest at the bottom (25) at the end of the socket (20) (FIGS. 11a-11d, 12a-12d) and wedges and immobilizes therein, the B-B' axis passing through the center and along of the neck (7) or the stem of the key blade (3), is parallel to the A-A' axis passing through the center and along of the centering groove (57) of the socket (20), while the two axes form a vertical plane.

On both key blades (3) with a flat neck (7) or with a cylindrical stem (40), at their resting position at the bottom (25) in the end of the socket (20) of the detachable key head (10), the pin groove (6) of the key blade (3) mates with the groove created by the through hole (22) in the inclined upper side surface (21) of the socket, forming a through hole from the center of which the C-C' axis passes. In the gap of this through hole (22), fasteners are inserted, preferably stainless steel dowel locking pin (49) so the key blade (3) is immobilized, and further wedged. By this way the key blade is securely locked into the detachable identification key head (10) (FIGS. 1c, 12a-12d) without any degree of freedom of movement.

The method of the formation of a key blade (3) of a key with a detachable identification key head is completed.

In order for the present invention of the detachable identification key head (10) to be applied to special cases of flip key blades which do not have a key head to be formed by the above method but have another shape at their ending (73) (FIG. 14*a*) from construction, or have a very thin key head (FIG. 14*g*), a connecting adapter with the same size with the socket (20) is fixed in to the socket (20) of the key head (10) (FIG. 14).

Specifically, to the factory key blades (FIG. 14*a*) of the current state of the art, such as, the flip key blades of immobilizer car keys, the key blade end with the factory shaped end (73) and the pin groove (74) is first fitted to a connecting adaptor A (71) (FIG. 14*b*, 14*c*), that has a recess (72) with a formation identical to the factory shaped end (73) of the key blade, indicatively, flip key blade, as well as pin groove (75) of the same cross-section and coaxially with pin groove (74) of the flip key blade (FIG. 14*d*). The connecting adaptor A (71) externally is geometrically and dimensionally identical to the dimensions of the truncated pyramid of the socket. Then, the connecting adaptor A together with the flip key blade (3) (FIG. 14*d*) plugs in to the socket (20) of the detachable key head (10) (FIG. 14*e*) and a fastener such as a dowel locking pin (49), passing both the pin groove (74) of the key blade and the pin groove (75) of the mounting connector A (FIG. 14*f*) locks and secures the key blade and the connecting adaptor A (71) into the socket in the manner described above for fixing all key blades (3) to the socket (20). Similarly, in order for the detachable identification key head (10) to be fitted to special keys with a very thin key head such as, for example, the so-called "tubular" keys (FIG. 14*g*) where no chamfer milling is possible, the key blade (3) is cut (with a key head part) only to a trapezoidal end (4) (without chamfer formation) (FIG. 14*h*) and then it is fitted to a connecting adaptor B (76). The connecting adaptor B (76) at one end has the formation of a truncated pyramid, geometrically and dimensionally identical to the dimensions of the truncated pyramid of the socket (20) of the detachable identification key head and has a pin groove (81) on the inclined upper side surface, while at the other end it has a slot (77) of trapezoidal shape (FIG. 14*i*) alike the trapezoidal shaped end (4) of the special key blade of the current state of the art, indicatively such as the so-called "tubular" key (FIG. 14*h*). The key blade is fastened to the connecting adaptor B (76) by any fastener, e.g. a dowel locking pin (78) that passes through a hole (79) of the key blade and hole (80) of the connecting adaptor B (76) (FIG. 14*k*). Next, the connecting adaptor B (76) with the key blade of these special key types secured therein, plugs into the socket (20) of the detachable key head (10) (FIG. 14*k*) and is secured by fasteners such as dowel locking pin (49) according to the method described in detail above in step 3 of the method for fixing any key blade (3) to the socket (20) (FIG. 14*l*).

For cutting and forming the desired trapezoidal shape (4) and chamfer to a truncated pyramid shape at the end of the key blade (3), when applying this method, a guide adaptor (11) is used in conjunction with an adaptor-clamp (8) (FIGS. 3, 4, 7).

In particular, the guide adaptor (11) consists of two parts: (a) the pattern (27) (FIGS. 6*a*) and (*b*) the mounting base (28) (FIG. 6*b*), joined together with a hinge joint (26) (FIG. 6*d*).

(a) Pattern (27), as shown in FIGS. 3, 4 and 6, has a guide slot (12) of trapezoidal shape and rectangular cross-section, a chamfer (16) on its upper side and a guide groove (19) perpendicular to the notional longitudinal axis (FIGS. 3*b*, 3*f*, 4*b*, 4*f*, 6*a* and 6*g*-6*h*). Also, the pattern (27), on the underside, has two holes, the upper positioning hole (31) and the lower positioning hole (32) for position selection, horizontal position or tilted position, in order to select a position with the help of a dowel (33) (FIGS. 6*a*, 6*d*, 6*f*).

Figure 7A:
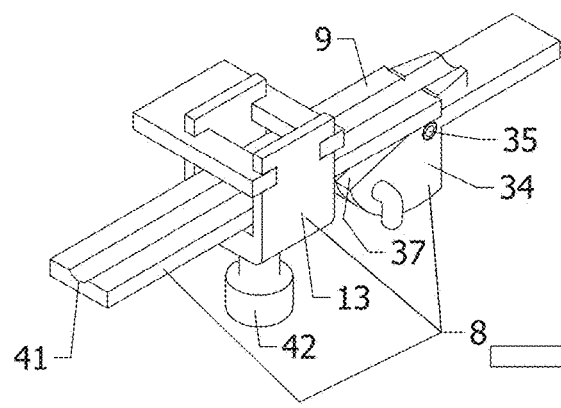
Figure 7B:
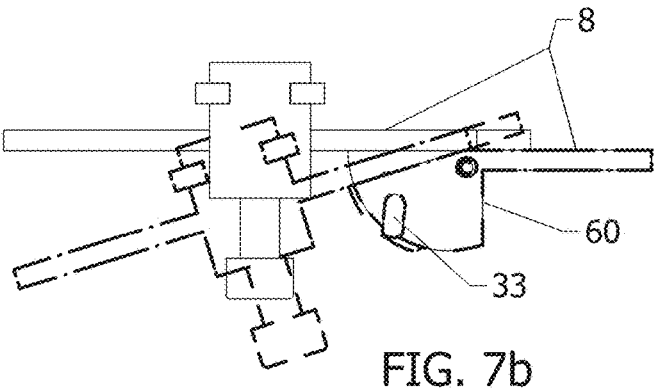
Figure 7C:
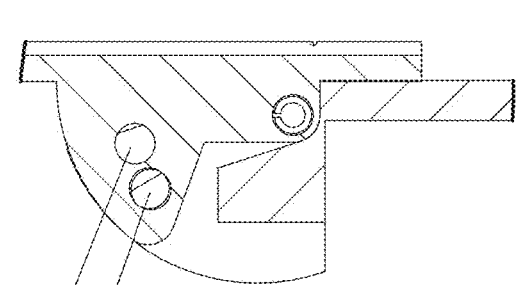
Figure 7D:
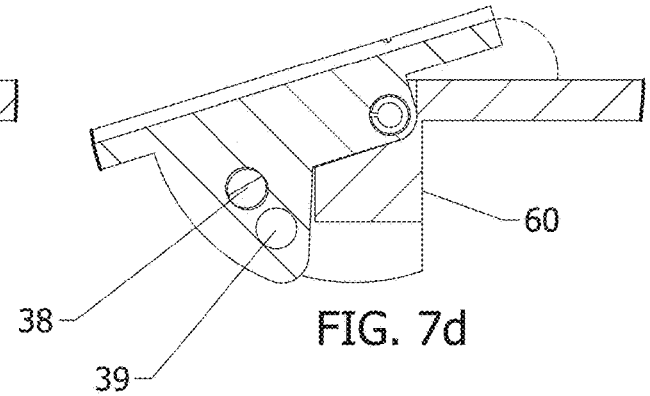
Figure 7E:
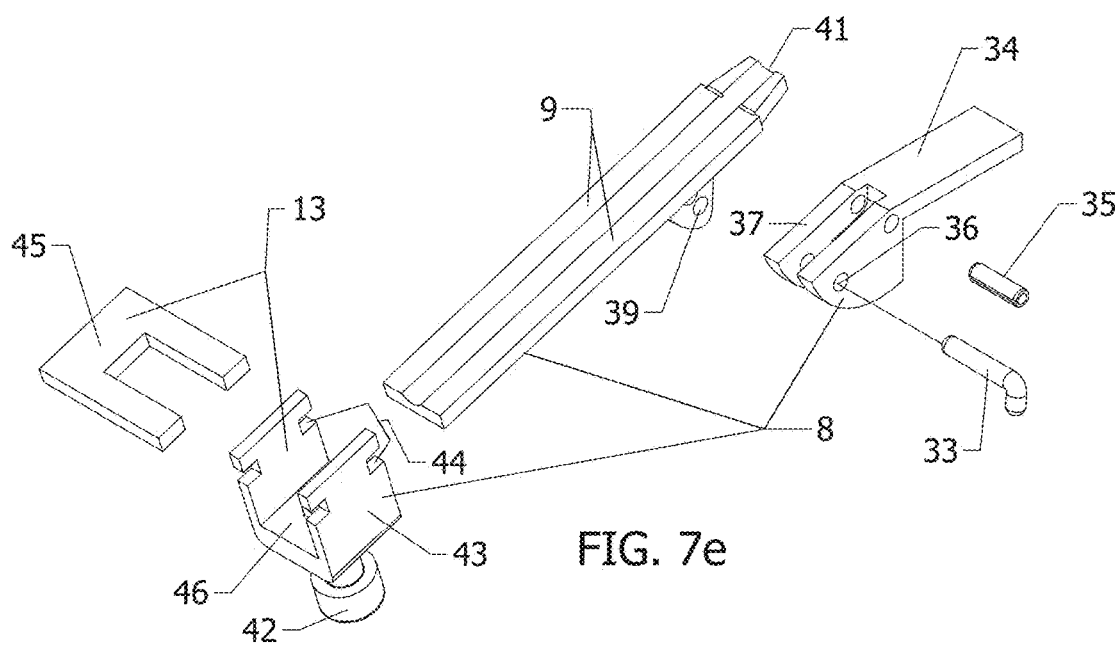

(b) The mounting base (28) has a stop "shoulder" (50) configuration (FIG. 6*b*) to rest when it is fully inserted to the clamp of the key cutting machine of the current state of the art and to be perfectly aligned with the adaptor-clamp (8) which has an identical mounting base (34). (FIG. 7*e*). The mounting base (28) also has a position selection hole (29) (FIGS. 3*b*, 3*f*, 4*b*, 4*f*, 6*b*, 6*h*) and its lateral sides sloped (30) (FIGS. 3*b*, 3*d*, 3*f*, 6*b*). When the dowel pin (33) passes through the position selection hole (29) of the mounting base (28) and the lower positioning hole (32) of the pattern (27), the pattern locks horizontally (FIGS. 3*b*, 3*d*, 3*f*, 6*c*, 6*d*), but when passing through the upper positioning hole (31) of the pattern (27), the pattern locks at tilted position (FIGS. 4*b*, 4*d*, 4*f*, 6*e*, 6*f*, 6*h*).

The adaptor-clamp (8) consists of three parts: a) the flat support bar (9), b) the mounting base (34), joined together with a hinge joint (35) (FIG. 7*e*) and c) the key holding clamp.

(a) The flat support bar (9) of the adaptor-clamp (8) is flat on the upper side for fixing flat neck keys. In the center and along it has a centering groove (41), for holding the keys having a cylindrical stem (40) (FIGS. 8*c*-8*d*), such as double bit keys etc. On the underside it has two holes the upper positioning hole (38) and the lower positioning hole (39) (FIGS. 7*c*, 7*d*) at the same points as the guide adaptor for position selection, in order to select the position at the same angle as the adaptor guide with the help of a dowel (33) (FIG. 7*b*).

(b) The mounting base (34) of the adaptor-clamp (8) (FIG. 7*e*) is geometrically and dimensionally identical to the mounting base (28) of the guide adaptor (11) (FIG. 6*b*) and therefore bears a stop "shoulder" (60) in the same position as the stop "shoulder" (50) of the mounting base (28) of the guide adaptor (11) (FIG. 6*b*) to be perfectly aligned to the datum point of the clamps of the key cutting machines. The mounting base (34) of the adaptor-clamp also has a position selection hole (36) (FIG. 7*e*) and sloped lateral sides (37) (FIGS. 7*a*, 7*e*). When the dowel (33) passes through the position selection hole (36) of the mounting base and the lower positioning hole (39) of the flat support bar (9), the flat support bar locks horizontally (FIG. 3*c*, 3*e*, 3*g*, 7*a*, 7*c*), and when passing through the upper positioning hole (38) of the flat support bar (9), the flat support bar (9) locks at tilted position (FIGS. 4*c*, 4*e*, 4*g*, 7*d*) same to the tilted position of the guide adaptor.

(c) A special key holder clamp (13) is used to hold the key (1), onto the flat support bar (9) of the adaptor-clamp (8), whether it is a flat key blade (3) or a key blade (3) with a cylindrical stem (40) consisting of two sections: a U-shaped frame (43) with a tightening screw (42) at the base (46) of the frame (43) and also a U-shape slider (45) (FIGS. 3*c*, 3*e*, 3*g*, 4*c*, 4*e*, 4*g*, 7*e*). The adaptor-clamp (8) functions as follows: the key (1) is mounted on the flat support bar (9) the frame (43), having the tightening screw (42) on the underside of the flat support bar (9), enters the flat support bar (9) to the point where the key is mounted (1), the slider (45) slides into the slots (44) which the frame has at its ends, the tightening screw (42) tightens from the underside of the flat support bar (9), the slider (45) holds and immobilizes the key onto the flat support bar (9). As the slider is U-shaped, its middle part is blank and thus the key (1) remains visible for better control of its alignment and fixation on the flat support bar (9). The slider makes it possible to place long stem keys on the flat support bar as it can be removed whenever need-ed.

An accuracy control tool (17) (drawing 5) is used to check the accuracy of the trapezoidal ending (4), the chamfer (5) and the pin groove (6) of the key blade (3), consisting of a flat bar (48) similar to the flat support bar (9) and with a centering groove (82) in the center and along, alike the centering groove (41) of the adaptor-clamp (8).

At the end of the flat bar (48) there is a protrusion (47) with a chamfer at the top and a trapezoidal shape recess (18) in vertical view with equal lateral sides perpendicular to the flat bar and converging towards the end of the recess to an irregular truncated pyramid shape, geometrically and dimensionally identical to the dimensions of the irregular truncated pyramid of the socket (20) of the detachable identification key head (10) where the formed key blade (3) is fixed. The protrusion (47) also bears a guide groove (19) transverse and perpendicular to the notional longitudinal axis and along it.

Examples of applying this method of cutting and forming the key blade (3) and fixing it to the detachable identification key head (10) are illustrated in FIGS. 11 and 12 (FIGS. 11a-11d, 12a-12d), where the same detachable identification key head (10) is fixed in different key blade (3) types and thicknesses.

For the application of the method the components press die (69), accuracy control tool (17), guide adaptor (11), adaptor-clamp (8), can be used together, for example: press die (69) in working with the accuracy control tool (17) for key blade (3) milling, or in conjunction with the guide adaptor (11) and the adaptor-clamp (8).

The detachable identification key head (10) may have a horizontal channel (54) and/or a vertical hole (55) for the key ring (FIGS. 1b-1d) or even rotatable.

The detachable identification key head may be of any material, such as metal or metal alloy, such as die casting zinc alloy, plastic or even 3D Printer resin, wooden, Plexiglas, etc.

The detachable identification key head (10) may bear in its surface the names of the keys in Braille script (FIG. 11a-11d), e.g. HOME, HOUSE, OFFICE, CELLAR, as well as photos, engravings etc.

The detachable identification key head (10) can have many external forms (FIGS. 15 and 16), can be of any shape, color or 3d shape and of any size and cross-section, and can have an exterior decoration of a variety of materials to distinguish from all the other keys. It can also bear mobile parts and other accessories, such as diamonds, crystals, and other stones, as well as trademarks as a business advertising material, etc.

The detachable identification key head (10) may have built in a high tech smart electronic device, such as a smart key, a smart watch (FIG. 13c) attached to a mobile phone, remote control, etc. as well as integrated holes and recesses (52) of different dimensions for mounting various components and electronic systems, monitors and PCB boards, various types of microchips (51), USB storage device, flashlights, alarms, speakers, technologies: NFC, wi-fi, blue tooth, GPS key tracking, etc. and signal slots (53) (FIG. 13) or others, as well as a visible or a hidden case for small objects.

For the implementation of the method, the centering groove (57) of the socket (20) of the detachable identification key head (10) may be a semi-cylindrical cross-section, but also of any other cross-section, such as for example V-shaped cross-section, etc. Similarly, the centering groove (41) of the adaptor-clamp (8) can be of any cross-section, such as for example a semi-cylindrical cross section or V-shaped cross-section, etc.

The detachable identification key head (10) and this cutting method are applied in the same way if during the first step of the process the cutting of the factory key head (2) from the key blade (3) of the key (1) with a flat neck (7) or cylindrical stem (40) to an isosceles trapezoidal end (4), is made directly with the key at tilted position.

This invention, a cutting and forming method, as well as the inventive apparatus-tools through which the method is applied, and the detachable identification key head (10), can be applied to all types of circulating keys in the market, such as cylinder keys, dimple keys, double bit keys, laser cut keys, universal keys, multi-profile keys, door lock keys, car keys, etc. For large businesses, hospitals, tourist facilities, etc. whole wings can be distinguished by different detachable identification key heads and bear engravings on the key head of the wing number and/or room number and many distinctive signs in general, such as names, etc.

The invention claimed is:

1. A key head adapted to interface with a key blade, the key blade arranged with a trapezoidal chamfered end, the key head comprising:
   a socket formed in the key head, wherein the socket is arranged to matingly engage the trapezoidal and chamfered end of the key blade, the socket including a concave feature having an irregular hollow truncated pyramid shape that includes:
      a first base having a rectangular shape and disposed opposite a closed end of the socket,
      a second base having a rectangular shape and disposed at the closed end of a bottom of the socket, the second base being smaller than the first base in dimension,
      a lower side surface having an isosceles trapezoidal shape, the lower side surface extending between the first and second bases;
      a right side surface and a left side surface, each of the right and left side surfaces converging in a direction from the first base towards the second base;
      an upper side surface extending between the first and second bases;
   wherein the socket further includes a fastener channel disposed parallel to the first and second bases.

2. The key head according to claim 1, wherein the key head is made of at least one of metal, metal alloy, die casting zinc alloy, plastic, 3D Printer resin, wood, and Plexiglas.

3. The key head according to claim 1, wherein a side surface of the key head carries on its surface indicia of a key name, the indicia including at least one of Braille, numbers, names, marks, trademarks, photographs, and engravings.

4. The key head according to claim 1, wherein the key head further includes an electronic device embedded therein.

5. The key head according to claim 1, further comprising an adapter disposed between the socket and the cavity of the key head.

6. The key head according to claim 1, wherein the key blade has a rectangular cross section or a circular cross section.

7. The key head of claim 1, wherein the lower side surface of the key head includes a centering ridge, the centering ridge disposed along an axis A-A', the axis A-A' extending perpendicularly relative to the first and second bases.

8. The key head of claim 1, wherein the key head further forms a through hole adapted to accept a fastener.

9. The key head of claim 8, further comprising the key blade including a fastener channel that is aligned with the through hole, and a fastener extending through the through hole and the fastener channel.

10. The key head of claim 9, wherein the fastener prevents removal of the key blade from the socket.

11. A method of constructing a key, comprising:

providing an original key having an integrated key blade with an original key head;

cutting the original key head from the key blade;

shaping a cut end of the key blade into an irregular truncated pyramid shape, wherein the irregular truncated pyramid shape comprises:

a first base having a rectangular shape disposed opposite a free end of the irregular truncated pyramid shape, a second base having a rectangular shape and disposed at a free end of the irregular truncated pyramid shape, the second base being smaller than the first base in dimension, a lower side surface having an isosceles trapezoidal shape, the lower side surface extending perpendicularly to and between the first and second bases;

a right side surface and a left side surface, each of the right and left side surfaces having a rectangular trapezoid shape and converging with each other towards the free end of the irregular truncated pyramid shape;

an upper side surface having an isosceles trapezoid shape and converging to the lower side surface towards the free end of the irregular truncated pyramid shape;

wherein the irregular truncated pyramid shape further includes a fastener channel formed in the upper side surface;

providing a key head, and releasably engaging the key head onto the irregular truncated pyramid shape of the key blade, wherein the key head forms a cavity that matingly engages the irregular truncated pyramid shape of the key blade;

securing the key head onto the key blade by inserting a fastener through a through hole formed in the key head in aligned relation with the fastener channel.

12. The method of claim 11, further comprising placing the original key onto a fixture prior to releasably engaging the key head onto the irregular truncated pyramid shape of the key blade.

13. The method of claim 12, further comprising locating the original key onto the fixture using a camera, 3d scanner, touch probe, or laser.

14. The method of claim 11, wherein shaping a cut end of the key blade further comprises using an adaptor clamp for securing the key blade during the cutting and forming operations.

15. The method of claim 11, further comprising verifying the shaping of the cut end of the key blade into the irregular truncated pyramid shape using a camera, 3d scanner, touch probe, or laser.

* * * * *